(12) United States Patent
Kmack et al.

(10) Patent No.: US 6,304,851 B1
(45) Date of Patent: Oct. 16, 2001

(54) MOBILE DATA COLLECTION SYSTEMS, METHODS AND COMPUTER PROGRAM PRODUCTS

(75) Inventors: Kenneth C. Kmack, Atlanta; Kevin K. Krigline, Newnan; Vicente E. Vallejo, Mableton; Jackie L. Tipsword, Kennessaw; William C. Morgan, Jr., Canton, all of GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/042,361

(22) Filed: Mar. 13, 1998

(51) Int. Cl.$^7$ .................................................. G06F 17/00
(52) U.S. Cl. .............................. 705/11; 705/31; 705/32; 702/136
(58) Field of Search .................... 705/11, 32, 35; 708/110, 139; 702/136

(56) References Cited

U.S. PATENT DOCUMENTS

| | | |
|---|---|---|
| 4,009,371 | 2/1977 | Hamilton et al. . |
| 4,019,174 | 4/1977 | Vanderpool et al. . |
| 4,408,183 | 10/1983 | Wills . |
| 4,413,277 | 11/1983 | Murray . |
| 4,591,974 | 5/1986 | Dornbush et al. . |
| 4,625,292 | 11/1986 | Philip . |
| 4,817,940 | 4/1989 | Shaw et al. . |
| 4,907,191 | 3/1990 | Sato . |
| 5,068,787 | 11/1991 | Pipella et al. . |
| 5,212,635 | 5/1993 | Ferriter . |
| 5,493,492 | 2/1996 | Cramer et al. . |
| 5,500,795 | 3/1996 | Powers et al. . |
| 5,508,977 | 4/1996 | Tymn . |
| 5,513,854 | 5/1996 | Daver . |
| 5,557,553 * | 9/1996 | Sellie, Sr. .............................. 364/569 |

FOREIGN PATENT DOCUMENTS

| | | |
|---|---|---|
| 4443850 A1 | 7/1995 | (DE) . |
| 405216522 * | 8/1993 | (JP) . |
| WO 96/27171 | 9/1996 | (WO) . |
| WO 97/06513 | 2/1997 | (WO) . |

OTHER PUBLICATIONS

John R Gyorki, Mulltitasking makes a difference in motion control, PP 1–2, Feb. 1998.*
Deitz Dan, Visualization on the fly, PP 1–2, Apr. 1996.*
Wilson ron, ISSCC takes to multimedia, PP 1–2, Oct. 1996.*
Almvig Lynne Michelle, Advanced robotic machining cell, PP 1, Sep. 1993.*
Herman, T.J. et al, Time and cost analysis of on–farm portable feed manufacturing, PP 1, Jan. 1997.*
Advertisement of Clemson Consulting Clearinghouse Corp., *Industrial Engineering Solution*, Feb., 1995, p. 39.
Materials printed from the Clemson Consulting Clearinghouse Corp. Website on Mar. 9, 1998.
*Work Measurement A Systems Approach*, by George L. Smith, Jr., Grid Publishing Inc., Ohio, USA (1978), pp. 47–59.

* cited by examiner

Primary Examiner—Eric W. Stamber
Assistant Examiner—Mussie Tesfamariam
(74) Attorney, Agent, or Firm—Alston & Bird LLP

(57) ABSTRACT

Systems, methods and computer program products are configured for conducting time and motion studies using a portable computing device having a memory, wherein the internal clock of the portable computing device measures the elapsed time for an observed activity as a user (i.e., time and motion study analyst) identifies the observed activity and any associated parameters, counts, measurements or comments via one or more customized user interfaces displayed on the portable computing device screen. The customized user interfaces are generated from data tables created during setup. The elapsed time, activity name, and the associated parameters, counts and comments are recorded in the memory of the portable computing device as an activity record for subsequent analysis.

16 Claims, 33 Drawing Sheets

HANDHELD PROFILE SHEET

FIG. 4A.

Profilea.xls:1

☐ Save Changes and Return to Menu — 130

This is a color coded sheet to help you complete a new profile sheet or to modify an existing one. Text entered in a yellow box will appear on the handheld as a label beside a drop down list, text entered in the white boxes will appear as selections in the drop down list and text entered in blue boxes will be displayed inside of the drop down lists to prompt the user to make a selection.

Enter the type of Route Below
CONVENTIONAL — 122

— 120

| In the white area below enter each activity that you wish to track. Use the Yellow Box to enter a label for the field | If you would like a counter for this activity enter the name of the counter in the box below i.e. Cases, Crates, etc. | Enter a Y here to enable this category for this activity. Use the Yellow Box to label the category. | Enter a Y here to enable this category for this activity. Use the Yellow Box to label the category. | Enter a Y here to enable this category for this activity. Use the Yellow Box to label the category. | Enter a Y here to enable this category for this activity. Use the Yellow Box to label the category. |
|---|---|---|---|---|---|
| Actions | Count Cases | Package Type | Display Type | | |
| <<Select an Action>> | | | | | |
| Morning Preparation | | | | | |
| Check-Out | Cases Leaving | | | | |
| Check-In | Cases Return | | | | |
| Travel No Load | | | | | |
| Travel With Load | | | | | |
| Unloading | Case Count | Y | | | |
| Stocking | Case Count | Y | Y | | |
| Face/Rotate/Sign | | Y | Y | | |

OUTLETS.xls

MDCS OUTLET INFORMATION

In the columns below enter information concerning each of the outlets you wish to survey. This information can be typed in manually or it can be pasted in using the Windows Clipboard (Cut, Copy and Paste). The only required fields are Outlet Number, Outlet Name and Route Number. The rest of the fields are optional but will greatly enhance your ability to find outlets on the handheld computer. When you are finished adding outlets to this list simply click the save button below and answer yes to the two resulting boxes Save    Return to Main Menu

— 144

145 —

| Enter the Outlet Number Here | Enter the Outlet Name Here | Enter the Type of Route Here (Opt.) | Enter the Outlet Address Here (Opt.) | Enter the Route Number Here | Enter the Channel # Here (Opt.) | Enter a site name or address if this outlet is a member of a multi-outlet site (Opt.) |
|---|---|---|---|---|---|---|
| 00323 | Outlet 30 | Conventional | Address 30 | 167 | 1 | |
| 00753 | Outlet 197 | Full Service | Address 197 | 135 | 35 | 753 |
| 00754 | Outlet 198 | Conventional | Address 198 | 167 | 16 | |
| 00775 | Outlet 200 | Full Service | Address 197 | 135 | 35 | 753 |
| 00777 | Outlet 202 | Conventional | Address 202 | 123 | 16 | |
| 00779 | Outlet 203 | Full Service | Address 197 | 135 | 35 | 753 |
| 00914 | Outlet 215 | Full Service | Address 197 | 135 | 35 | 753 |
| 03219 | Outlet 29 | Full Service | Address 197 | 135 | 35 | 753 |
| 04892 | Outlet 85 | Conventional | Address 85 | 123 | 1 | |
| 04896 | Outlet 86 | Full Service | Address 86 | 135 | 20 | |
| 06806 | Outlet 110 | Full Service | Address 110 | 135 | 20 | |
| 06807 | Outlet 111 | Conventional | Address 111 | 167 | 35 | |
| 06808 | Outlet 114 | Conventional | Address 114 | 167 | 20 | |
| 06810 | Outlet 115 | Conventional | Address 115 | 123 | 35 | |
| 06811 | Outlet 116 | Full Service | Address 116 | 135 | 16 | |
| 06816 | Outlet 118 | Conventional | Address 118 | 123 | 20 | |
| 06820 | Outlet 119 | Full Service | Address 119 | 135 | 35 | 6820 |
| 06821 | Outlet 120 | Conventional | Address 120 | 167 | 16 | |

FIG. 6.

MDCS LABEL LIST

The column below contains the current English text that the handheld utilizes. Make any changes that you wish by simply overwriting the existing text. Once your changes are complete click the Save button, answer yes in both dialog boxes and then click the Goto Main Menu button.

| Save | Goto Main Menu |
|---|---|
| Application initializing. Please wait. Copyright© | This screen displays while the application is loading |
| Loading Profile. Please wait. | This screen displays when you change routes |
|  | This screen displays when you change profiles |
| Analyst: | Text beside the Analyst drop-down list |
| Driver: | Text beside the Driver drop-down list |
| Route: | Text beside the Route drop-down list |
| Outlet: | Text beside the Outlet drop-down list |
| Profile: | Text beside the Profile drop-down list |
| Save Event | Text on the Save Event button |
| Save for Review | Text on the Save for Review button |
| Site Timer | Text beside the Site Timer |
| Select a profile, driver, and route. | Title bar for Start of Day dialog box |
| MDCS 021398 | Name of the Program |
| Session not started. | Warning that the day has not yet started |
| Are you sure you want to end the day? | Warning displayed when you attempt to end the day |
| Outlet Name: | Text in the Outlet drop-down list (top right of Handheld screen) |
| Address: | Same as above |
| Location: | Same as above |
| Same Location: | Same as above |
| Rename output file to: | Prompt for saving the output file |
| Select all of above, then Press to Start Session | Text for Start day button |
| Change Profile to | Text for Change Profile dialog box |
| Change Route to | Text for Change Route dialog box |
| <<Click Here>> | Text to prompt user when Application is Opened |

FIG. 8.

| | A | B | C |
|---|---|---|---|
| 1 | <<t_Init>> | Application initializing. Please wait. Copyright©1998, an unpublished work by The Coca-Cola Company. All rights reserved. | This screen displays while the application is loading |
| 2 | <<t_LoadOutlets>> | Loading Outlets. Please wait. | This screen displays when you change routes |
| 3 | <<t_LoadProfile>> | Loading Profile. Please wait. | This screen displays when you change profiles |
| 4 | <<t_Analyst>> | Analyst: | Text beside the Analyst Drop-down list |
| 5 | <<t_Driver>> | Driver: | Text beside the Driver drop-down list |
| 6 | <<t_Route>> | Route: | Text beside the Route drop-down list |
| 7 | <<t_Outlet>> | Outlet: | Text beside the Outlet drop-down list |
| 8 | <<t_Profile>> | Profile: | Text beside the Profile drop-down list |
| 9 | <<t_Save>> | Save Event | Text on the Save Event button |
| 10 | <<t_SaveReview>> | Save for Review | Text on the Save for Review button |
| 11 | <<t_Timer>> | Site Timer | Text beside the Site Timer |
| 12 | <<t_Select>> | Select a profile, driver, and route. | Title bar for Start of Day dialog box |
| 13 | <<t_MDCS>> | MDCS 021398 | Name of the Program |
| 14 | <<t_NoDay>> | Session not started. | Warning that the day has not yet started |
| 15 | <<t_SureEnd>> | Are you sure you want to end the day? | Warning displayed when you attempt to end the day |
| 16 | <<t_OutletName>> | Outlet Name: | Text in the Outlet drop-down list (top right of Handheld Screen) |
| 17 | <<t_Address>> | Address: | Same as above |
| 18 | <<t_Location>> | Location: | Same as above |
| 19 | <<t_SameLoc>> | Same Location: | Same as above |
| 20 | <<t_Rename>> | Rename output file to: | Prompt for saving the output file |
| 21 | <<t_StartDay>> | Select all of above, then Press to Start Session | Text for Start Day button |
| 22 | <<t_ChangeProfile>> | Change Profile to | Text for Change Profile dialog box |
| 23 | <<t_ChangeRoute>> | Change Route to | Text for Change Route dialog box |
| 24 | <<t_SelectSearch>> | >>Click Here<< | Text to prompt user when Application is Opened |
| 25 | <<t_Dummy>> | Dummy | Label for Dummy Outlet |
| 26 | <<t_Channel>> | Channel | Label for Channel # Field |
| 27 | <<t_Instruction>> | This is Help Screen 1 | Text for First Paragraph of Help Screen |
| 28 | <<t_Instruction>> | This is Help Screen 2 | Text for additional Paragraphs of Help Screen |
| 29 | <<t_Instruction>> | This is Help Screen 3 | Text for additional Paragraphs of Help Screen |

| | A | B | C | D | E | F | G |
|---|---|---|---|---|---|---|---|
| | COMMENTS | PROFILE | DRIVER | OUTLET | ACTION | COUNT | CATEGORY1 |
| 1 | | | | | | | |
| 2 | | Pre Sell Delivery | Marion Haste | 453261 | Drive Initial | | |
| 3 | | Pre Sell Delivery | Marion Haste | 453261 | Invoice Generation | | |
| 4 | repair printer invoice | Pre Sell Delivery | Marion Haste | 453261 | Misc-Add Comment | | |
| 5 | | Pre Sell Delivery | Marion Haste | 453261 | Invoice Generation | | |
| 6 | | Pre Sell Delivery | Warren Pease | 453301 | Drive Initial | | |
| 7 | getting ready to unload | Pre Sell Delivery | Marion Haste | 453261 | Misc-Add Comment | | |
| 8 | | Pre Sell Delivery | Marion Haste | 453261 | Unloading | 8 | 3 Liter |
| 9 | | Pre Sell Delivery | Marion Haste | 453261 | Travel With Load | | |
| 10 | | Pre Sell Delivery | Marion Haste | 453261 | Communicate w/Manager | | |
| 11 | | Pre Sell Delivery | Marion Haste | 453261 | Travel No Load | | |
| 12 | | Pre Sell Delivery | Warren Pease | 453301 | Unloading | 10 | 20 oz Plastic B(singles) |
| 13 | | Pre Sell Delivery | Marion Haste | 453261 | Unloading | 5 | 12 oz Cans 4-6 packs |
| 14 | | Pre Sell Delivery | Manuel Transmis | 178737 | Drive Initial | | |
| 15 | | Pre Sell Delivery | Marion Haste | 453261 | Unloading | 6 | 12 oz Cans 4-6 packs |
| 16 | | Pre Sell Delivery | Marion Haste | 453261 | Travel With Load | | |
| 17 | | Pre Sell Delivery | Marion Haste | 453261 | Unloading | | |
| 18 | | Pre Sell Delivery | Marion Haste | 453261 | Travel No Load | | |
| 19 | | Pre Sell Delivery | Marion Haste | 453261 | Unloading | 5 | 20 oz Plastic B(singles) |
| 20 | | Pre Sell Delivery | Marion Haste | 453261 | Unloading | 1 | 20 oz Plastic B(singles) |
| 21 | Clean Mess | Pre Sell Delivery | Warren Pease | 453301 | Misc-Add Comment | | |
| 22 | | Pre Sell Delivery | Marion Haste | 453261 | Travel No Load | | |
| 23 | | Pre Sell Delivery | Warren Pease | 453301 | Travel With Load | | |
| 24 | | Pre Sell Delivery | Marion Haste | 453261 | Unloading | 2 | 20 oz Plastic B(singles) |
| 25 | | Pre Sell Delivery | Marion Haste | 453261 | Product Check-In | | |

| FIG. 18A. | FIG. 18B. |
|---|---|
| FIG. 18C. | FIG. 18D. |

FIG. 18.

| H | I | J | K | L | M | N | O | P | Q |
|---|---|---|---|---|---|---|---|---|---|
| CATEGORY2 | EG | EG | REVIEW | TIME(Min) | DATE | ROUTE | Hheld ID | ANALYST | CHANNEL NO |
| | | | No | 47.75 | 1/20/98 7:20 | 123 | Eek #5 | Analyst 1 | 1 |
| | | | No | 2.63 | 1/20/98 7:23 | 123 | Eek #5 | Analyst 1 | 1 |
| | | | No | 1.53 | 1/20/98 7:25 | 123 | Eek #5 | Analyst 1 | 1 |
| | | | No | 1.22 | 1/20/98 7:26 | 123 | Eek #5 | Analyst 1 | 1 |
| | | | No | 26.02 | 1/20/98 7:28 | 456 | Brak #2 | Analyst 2 | 1 |
| | | | No | 3.13 | 1/20/98 7:29 | 123 | Eek #5 | Analyst 1 | 1 |
| | | | No | 0.40 | 1/20/98 7:29 | 123 | Eek #5 | Analyst 1 | 1 |
| | | | No | 1.07 | 1/20/98 7:30 | 123 | Eek #5 | Analyst 1 | 1 |
| | | | No | 0.25 | 1/20/98 7:31 | 123 | Eek #5 | Analyst 1 | 1 |
| | | | No | 0.57 | 1/20/98 7:31 | 123 | Eek #5 | Analyst 1 | 1 |
| | | | No | 3.58 | 1/20/98 7:31 | 456 | Brak #2 | Analyst 2 | 1 |
| | | | No | 0.57 | 1/20/98 7:32 | 123 | Eek #5 | Analyst 1 | 1 |
| | | | No | 45.03 | 1/20/98 7:32 | 789 | Crooow #3 | Analyst 3 | 1 |
| | | | No | 0.43 | 1/20/98 7:32 | 123 | Eek #5 | Analyst 1 | 1 |
| | | | No | 0.93 | 1/20/98 7:33 | 123 | Eek #5 | Analyst 1 | 1 |
| | | | No | 0.48 | 1/20/98 7:34 | 123 | Eek #5 | Analyst 1 | 1 |
| | | | No | 0.45 | 1/20/98 7:34 | 123 | Eek #5 | Analyst 1 | 1 |
| | | | No | 0.22 | 1/20/98 7:34 | 123 | Eek #5 | Analyst 1 | 1 |
| | | | No | 0.37 | 1/20/98 7:35 | 123 | Eek #5 | Analyst 1 | 1 |
| | | | No | 3.57 | 1/20/98 7:35 | 456 | Brak #2 | Analyst 2 | 1 |
| | | | No | 0.78 | 1/20/98 7:40 | 123 | Eek #5 | Analyst 1 | 1 |
| | | | No | 0.82 | 1/20/98 7:40 | 456 | Brak #2 | Analyst 2 | 1 |
| | | | No | 0.58 | 1/20/98 7:40 | 123 | Eek #5 | Analyst 1 | 1 |
| | | | No | 1.77 | 1/20/98 7:47 | 123 | Eek #5 | Analyst 1 | 1 |

FIG. 18B.

FROM FIG. 18A.

TO FIG. 18D.

| | | | | |
|---|---|---|---|---|
| 26 | Pre Sell Delivery | Manuel Transmis | 178737 | Unloading | 1 | 20 oz Plastic B(singles) |
| 27 | Pre Sell Delivery | Marion Haste | 453261 | Backroom Maintenance | | |
| 28 | Pre Sell Delivery | Manuel Transmis | 178737 | Travel With Load | | |
| 29 | Pre Sell Delivery | Manuel Transmis | 178737 | Travel No Load | | |
| 30 | Pre Sell Delivery | Marion Haste | 453261 | Stocking | 2 | 3 Liter |
| 31 | Pre Sell Delivery | Manuel Transmis | 178737 | Travel With Load | | |
| 32 | Pre Sell Delivery | Manuel Transmis | 178737 | Travel No Load | | |
| 33 | Pre Sell Delivery | Marion Haste | 453261 | Stocking | 2 | 3 Liter |
| 34 | Pre Sell Delivery | Manuel Transmis | 178737 | Travel With Load | | |
| 35 | Pre Sell Delivery | Marion Haste | 453261 | Face/Rotate/Sign | | 3 Liter |
| 36 | Pre Sell Delivery | Warren Pease | 453301 | Stocking | 10 | 20 oz Plastic B(singles) |
| 37 | Pre Sell Delivery | Marion Haste | 453261 | Stocking | 1 | 3 Liter |
| 38 | Pre Sell Delivery | Warren Pease | 453301 | Crate Collection | | |
| 39 | Pre Sell Delivery | Marion Haste | 453261 | Face/Rotate/Sign | | 3 Liter |
| 40 | Pre Sell Delivery | Warren Pease | 453301 | Travel With Load | | |
| 41 | Pre Sell Delivery | Manuel Transmis | 178737 | Travel With Load | | |
| 42 | Pre Sell Delivery | Marion Haste | 453261 | Stocking | 1 | 3 Liter |
| 43 | Pre Sell Delivery | Manuel Transmis | 178737 | Travel No Load | | |
| 44 | | | | | | |
| 45 | | | | | | |

FIG. 18C.

FROM FIG. 18B.

| | | | | |
|---|---|---|---|---|
| No | 0.28 | 1/20/98 7:47 | 789 | Crooow #3 | Analyst 3 | 1 |
| No | 0.37 | 1/20/98 7:47 | 123 | Eek #5 | Analyst 1 | 1 |
| No | 0.77 | 1/20/98 7:47 | 789 | Crooow #3 | Analyst 3 | 1 |
| No | 0.15 | 1/20/98 7:48 | 789 | Crooow #3 | Analyst 3 | 1 |
| Yes | 0.73 | 1/20/98 7:48 | 123 | Eek #5 | Analyst 1 | 1 |
| No | 0.40 | 1/20/98 7:48 | 789 | Crooow #3 | Analyst 3 | 1 |
| No | 0.27 | 1/20/98 7:48 | 789 | Crooow #3 | Analyst 3 | 1 |
| No | 0.60 | 1/20/98 7:49 | 123 | Eek #5 | Analyst 1 | 1 |
| No | 0.43 | 1/20/98 7:49 | 789 | Crooow #3 | Analyst 3 | 1 |
| No | 0.43 | 1/20/98 7:49 | 123 | Eek #5 | Analyst 1 | 1 |
| No | 3.85 | 1/20/98 7:49 | 456 | Brak #2 | Analyst 2 | 1 |
| No | 0.30 | 1/20/98 7:49 | 123 | Eek #5 | Analyst 1 | 1 |
| No | 0.40 | 1/20/98 7:50 | 456 | Brak #2 | Analyst 2 | 1 |
| No | 0.32 | 1/20/98 7:50 | 123 | Eek #5 | Analyst 1 | 1 |
| No | 0.43 | 1/20/98 7:50 | 456 | Brak #2 | Analyst 2 | 1 |
| No | 1.12 | 1/20/98 7:50 | 789 | Crooow #3 | Analyst 3 | 1 |
| No | 0.77 | 1/20/98 7:50 | 123 | Eek #5 | Analyst 1 | 1 |
| No | 0.40 | 1/20/98 7:50 | 789 | Crooow #3 | Analyst 3 | 1 |

240

Shelf
Shelf
Cool Guides
Shelf
Shelf
Shelf
Shelf

FROM FIG. 18C.

FIG. 18D.

MOBILE DATA COLLECTION SYSTEMS, METHODS AND COMPUTER PROGRAM PRODUCTS

FIELD OF THE INVENTION

The present invention generally relates to time and motion studies, and more particularly, to collecting time and event data for time and motion studies.

BACKGROUND OF THE INVENTION

Beginning at least with the manufacturing revolution at the end of the nineteenth century, the study of the human body at work has been an integral component of improving productivity and efficiency. The study of the human body at work is often referred to as time and motion study. Briefly stated, a time and motion study is the direct observation of an activity being performed by a worker to determine the time which should be allowed the worker, who has normal skill and ability and is working at a normal pace, to perform the defined activity according to a proven method and under specified conditions. This includes allowances for fatigue and for personal and unavoidable delays. Further background information regarding the science of time and motion studies can be found, for example, in "Work Measurement, A System Approach," by George L. Smith, Jr., Grid Publishing Inc., Ohio, USA (1978).

Time and motion studies became widely instituted around the end of the nineteenth century when factories began using electricity to power machinery that emphasized the handling and movement of materials using conveyor belts, cranes and other devices. Scientists and engineers realized that the human body is a system that was subject to the laws of conservation of energy (i.e., the first and second laws of thermodynamics), just like any other piece of machinery. Thus, the human body began to be viewed as a source of latent power that was integral to the efficiency and productivity of working systems such as a factory.

Time and motion study was being pioneered during this time period by individuals such as Frederick W. Taylor, and is now recognized as an important component of industrial engineering. In the early nineteen hundreds, consultants were often brought into factories by management to increase the efficiency and reduce the fatigue of workers. Frank and Lillian Gilbreths were early consultants that were well known for their consulting work and for their definition of sixteen basic units of movement which they dubbed "therbligs".

From the early days of time and motion study by people such as the Gilbreths and Frederick W. Taylor to current day practices, little has changed in the method by which time and event data is collected. This may be because the data collected for analysis is primarily the same today as it was one hundred years ago. While the activities being studied and the methods/means of data analysis may be quite different today that those of one hundred years ago, the steps of data collection have undergone little change.

For example, for any given task, a time and motion study analyst initially divides the task into activities or actions. The activities should be carefully chosen so that they are logical, have discreet beginning and ending points, are of an appropriate length in duration, and are worker controlled. The analyst may then conduct the time and motion study. This usually comprises the steps of the analyst observing the worker performing the various activities of the task, and recording appropriate time and event data associated with each activity. The data recorded for each activity may include comments, elapsed time, counts, or any other suitable information or measurements that might have bearing upon the accuracy and validity of the study.

The data collection steps described above have essentially gone unchanged in the last one hundred years. Moreover, the basic equipment utilized in data collection today is also substantially the same. From the earliest days, time and motion analysts have used a sweep-hand stopwatch and a clipboard with a data sheet attached thereto for collecting time and motion study data. The stopwatch has been preferably calibrated in decimal minutes, and typically mounted to the clipboard. Thus, the analyst times the activity using the stopwatch and then manually enters the time it takes the worker to complete the observed activity on data sheet attached to the clipboard. In addition, the analyst also manually records on the data sheet information such as the type activity, the counts (if applicable), comments, or any other defining parameters or measurements relevant to the time and motion study. This is a time consuming task that distracts the analyst from observing the worker. Thus, the analyst may miss or lose track of the activity which may result in corrupted or inaccurate data. Further, recording all the necessary information by writing on the data sheet can often times be difficult if the activities are short in duration, also resulting in corrupt or inaccurate data. Since the analyst enters subjective information such as comments, there may be little to no standardization. This may result in meaningless data when comments of one analyst are combined with comments of another analyst. Once the data has been collected, the data is now typically keyed into a computer so as to put the data in an electronic format for analysis. This can be a time consuming task, and may introduce even further opportunity for error in the data.

An alternative to the sweep-hand stopwatch is the digital watch-board such as that disclosed in U.S. Pat. No. 5,557, 553 to Clifford N. Sellie, Sr. Digital watch-boards typically comprise a clipboard surface for attaching a data sheet on which the analyst manually records various information and data. The digital watch-board may also include electronic circuitry for recording the elapsed time for an activity, and for associating each recorded time with an activity number. The activity numbers are assigned in a particular order corresponding with a customary sequence of activities for a task. The digital watch-board automatically increments the activity number when the end of each activity is noted. Thus, the analyst is required to match activity numbers to particular activities either during or after the time and motion study. Further, if the activities are taken out of the pre-assigned, customary sequence, then the analyst must take further steps to enter in a new activity number that will be defined later by the analyst. Accordingly, the analyst is still relegated to manually writing down data defining the activity being recorded so that later it can be associated with an elapsed time recorded in a memory of the digital watch-board. Digital watch-boards also appear to require significant training to operate because of the limited information typically available on the display of a digital watch-board, and the non-intuitive toggle switches utilized for controlling the operation of the digital watch-board.

A deficiency of both the stopwatch/clipboard and digital watch-board is that the analyst is distracted from his/her observation of the worker in order to record data on a data sheet and/or to operate a timing device. In addition, both the stopwatch/clipboard and digital watch-board can be bulky and heavy, and therefore, physically taxing on the analyst who must often times carry the stopwatch/clipboard or digital watch-board as he/she follows a worker throughout a day. The analyst also may have to perform additional data entry tasks in order to place all the collected data in a format for analysis, for instance, in an electronic form.

In an effort to circumvent the deficiencies of the stopwatch/clipboard and digital watch-board, the use of video equipment has been proposed for conducting time and motion studies. The video equipment may be setup to continuously film an activity so that the recorded video can be later reviewed at the convenience of the analyst. However, the video recording equipment is typically stationary and is not able to follow a worker performing activities outside the viewing angle of the stationary camera, thereby making it difficult in many instances to collect complete data records for a time and motion study. The output from video equipment is not readily usable for analysis, but has to be rewound or reversed to play back the recording to view the events recorded. Further, the video equipment is typically expensive and requires a greater degree of training and care to operate than the stopwatch and clipboard.

Accordingly, a heretofore unsatisfied need exists in the industry for a system and method for efficiently and accurately collecting time and event data for time and motion studies.

SUMMARY OF THE INVENTION

It is therefore an object in the present invention to provide an improved data collection methods, apparatuses and computer program products related to time and motion studies.

It is another object in the present invention to provide more accurate data for use in time and motion studies.

It is another object of the present invention to provide simplified and intuitive data collection for time and motion studies.

It is another object of the present invention to provide a highly configurable tool for conducting time and motion studies.

These and other objects are accomplished, according to the present invention, by an extensively configurable measurement tool that may comprise a workstation for customizing a portable computing device for broad application in data gathering for time and motion studies. The workstation performs a setup that generates customized data tables that are downloaded to the portable computing device. The portable computing device then utilizes the data tables to generate customized user interfaces that present predefined lists and parameters that were defined during setup. Thus, the user can quickly and easily select activities and parameters during a time and motion study for accurately recording data for subsequent analysis.

The present invention may be implemented by systems, methods and computer program products configured for conducting time and motion studies using a portable computing device having a memory, wherein the internal clock of the portable computing device records the elapsed time for an observed activity as a user (i.e., time and motion study analyst) identifies the observed activity and any associated parameters, counts, or comments via one or more customized user interfaces displayed on the portable computing device screen. The customized user interfaces can be provided by generating them from data tables created during setup. The elapsed time, activity name, and the associated parameters, counts and comments can be recorded in the memory of the portable computing device as an activity record for subsequent analysis.

The customized user interfaces enable the user to quickly and efficiently enter data and information related to the observed activity. The user interfaces are generated from one or more setup tables preferably created during setup. During setup, a user defines a list of activities for a particular task, and a list of parameters for defining the different activities. A list of possible values is also defined for each parameter. The parameters are then associated with the respective activities for defining each of the activities. For instance, the task of servicing point of purchase outlets may include the activity of unloading goods. The activity of unloading goods may have associated with it the parameters of (1) type of goods and (2) count of goods. The type of goods parameter may have a list of possible values such as product packages (e.g., 12 ounce cans or 20 ounce plastic bottle) from which the user can select. Thus, by customizing the lists of activities, parameters and values for a particular time and motion study, the data collection process can be simplified and made more intuitive.

The lists of activities, parameters, and values defined during setup are preferably formatted in setup tables. The setup tables are utilized by the data collection program to customize the user interfaces displayed in the portable computing device. The customized nature of the user interfaces allows the user to quickly and more accurately enter data and information. Further, the user selects the information from a pre-selected list so the resulting data is more uniform, with fewer variances. Thus, the setup provides for an extensively configurable measurement tool via the portable computing device. Therefore, the present invention has broad application in time and motion studies, whether conducting time and motion studies for production, warehouse/ material handling, retail, or office tasks. In addition, the setup is implemented with menu-driven/fill-in-the-blank user interfaces which can be used by a non-programmer to configure and customize the list of activities, parameters and values, and thus, the user interfaces.

Another advantageous feature of the present invention is the save event function presented to the user via the user interfaces of the portable computing device. The save event function, which is implemented in a preferred embodiment via a save event button, performs multiple functions which simplify and streamline the data collection process. In particular, the save event button substantially simultaneously ends a time measurement period for an activity, resets a reference clock displayed to the user, and writes an activity record to memory for the activity that ended. Thus, the save event button significantly reduces the number of actions required by the user to record information and data defining a particular activity, and more particularly, it reduces the steps required at the end of one activity and the beginning of the next.

Yet another advantageous feature of the present invention is the use of an internal clock of the portable computing device to provide continuous timekeeping. Thus, time recording can continue to take place if the portable computing device is accidentally turned off or the main batteries are removed. This reduces the likelihood of erroneous or incomplete data being recorded for an activity, and thereby, offers more reliable data collection.

In particular, the internal clock of the portable computing device runs continuously which enables the analyst to continuously time an activity even if the portable computing device is turned off or the power source is removed. This is preferably achieved, at least in part, by recording a start time in a working file stored in the non-volatile memory of the portable computing device at the beginning of an observed activity. Since the start time is recorded in the non-volatile memory of the portable computing device, the portable computing device can be turned off or the main batteries removed without losing the start time. Once the portable computing device is restarted, the data collection program executing on the portable computing device looks for the working file to determine if an activity was being measured at the time power was lost. If so, the data collection program restores the user interfaces to its previous state as though there was no interruption. Therefore, the end of the activity can be noted using the save event button which triggers the capture of the end time. The end time can then be used with the start time to calculate the elapsed time regardless of whether or not the power was turned off or the batteries removed during the interim. Thus, the only thing lost during the time of the power loss is the opportunity to end the event or identify any parameters.

An embodiment of the present invention includes methods for conducting time studies using a portable computing device having a memory comprises the steps of defining a list of activities and storing the list of activities in the memory of the portable computing device, marking a start time for an activity, selecting the activity preferably from the list of activities stored in memory, marking an end of the activity, and creating an activity record including a time reference in the memory. A second activity record may be created at the beginning of a second activity, wherein a second event record would include a second start time reference that substantially coincides in time with the end time reference. Further steps may include the association of the activity selected with the activity record, and creating successive activity records for successive activities.

The step of marking an end time of the activity may include the step of writing the activity record to a data file that comprises a plurality of activity records. The step of defining the list of activities may include the step of defining parameters for at least one of the activities. For each parameter defined, pre-selected list of values may also be defined.

A user interface for display on the portable computing device may be generated from the list of activities. A component of the user interface may include session identifiers defined by the user. In addition, session identifiers may be associated with the activity record. Further, the time references may be calculated from the start time and end time of the activity.

In accordance with another aspect of the present invention, methods for conducting time and motion studies where an analyst observes and records time and event data for activities performed by a worker, and wherein the time and event data is recorded utilizing a portable computing device having memory are provided. The methods, in one embodiment, comprise the step of defining a list of activities. In addition, the methods may include the step of generating a user interface for the portable computing device based on the list of activities, wherein the user interface presents the activities to the analyst as selectable options. The method may further include the steps of selecting an activity being performed by the worker from the list of activities display via the user interface, and recording an activity record in the memory device, wherein a time reference and the selected activity are associated with the activity record. The method may further include the step of marking an end time of the activity. The step of recording an activity record may be in response to the step of indicating an end of the activity. The method may further include the steps of defining a parameter for at least one activity in the list of activities, and defining values for the parameter defined.

In accordance with another aspect of the present invention, methods for conducting time and motion studies where an analyst observes and records time and event data performed by a worker, wherein an analyst records time and event data utilizing a portable computing device, comprise the steps of creating a profile of related activities, creating a list of session identifiers, and formatting the profile and session identifier list into a data structure that can be utilized to generate a user interface that presents the analyst with selectable options for defining an observed activity. The method may further include the step of creating a list of parameters for each one of the activities, wherein one of the parameters includes a list of pre-selected values.

In accordance with another aspect of the present invention, methods for conducting time and motion studies utilizing a portable computing device, wherein an analyst observes and records time and event data for activities performed by a worker, comprise the steps of starting a time and motion study session which marks a start time, selecting an activity being performed by the worker utilizing pre-defined values from a user interface of the portable computing device, and marking an end time of the activity when the worker has completed the activity. The method may further include the step of recording an activity record of the activity in response to the step of marking an end time.

In accordance with yet another aspect of the present invention, a system for conducting time and motion studies using a portable computing device having a memory comprises means for defining a list of activities and means for storing a list of activities in the memory of the portable computing device. The system further comprises means for marking a start time of an activity, means for selecting the activity from the list stored in the memory, and means for marking an end time of the activity with an end time reference. This system may further include means for recording an activity record in the memory, wherein the activity record includes the start time, a reference to the activity selected, and the end time. The means for defining the list of activities may include means for defining parameters for one or more of the activities, and means for defining values for the parameters defined. This system may further include means for generating a user interface from the list of activities.

Other features and advantages of the present invention will become apparent to one that is skilled in the art upon examination of the following drawings and detailed description. It is intended that all such additional features and advantages be included herein within the scope of the present invention, as defined in the appended claims. Further, it will be appreciated by those of skill in the art that the above described methods and systems of the invention may be provided as computer readable program means.

BRIEF DESCRIPTION OF THE DRAWINGS

FIGS. 4A and 4B collectively illustrate an example of a profile sheet user interface in accordance with the setup program of the present invention.

FIGS. 5–7 are examples of session identifier list user interfaces in accordance with the setup program of the present invention.

FIG. 8 is an example of a label list user interface in accordance with the setup program of the present invention.

FIG. 9 is an example of a setup table generated by a setup program in accordance with the present invention.

FIG. 18 is an example of a data table generated by a data collection program in accordance with the present invention.

DETAILED DESCRIPTION OF THE PREFERRED EMBODIMENTS

Figure 1:
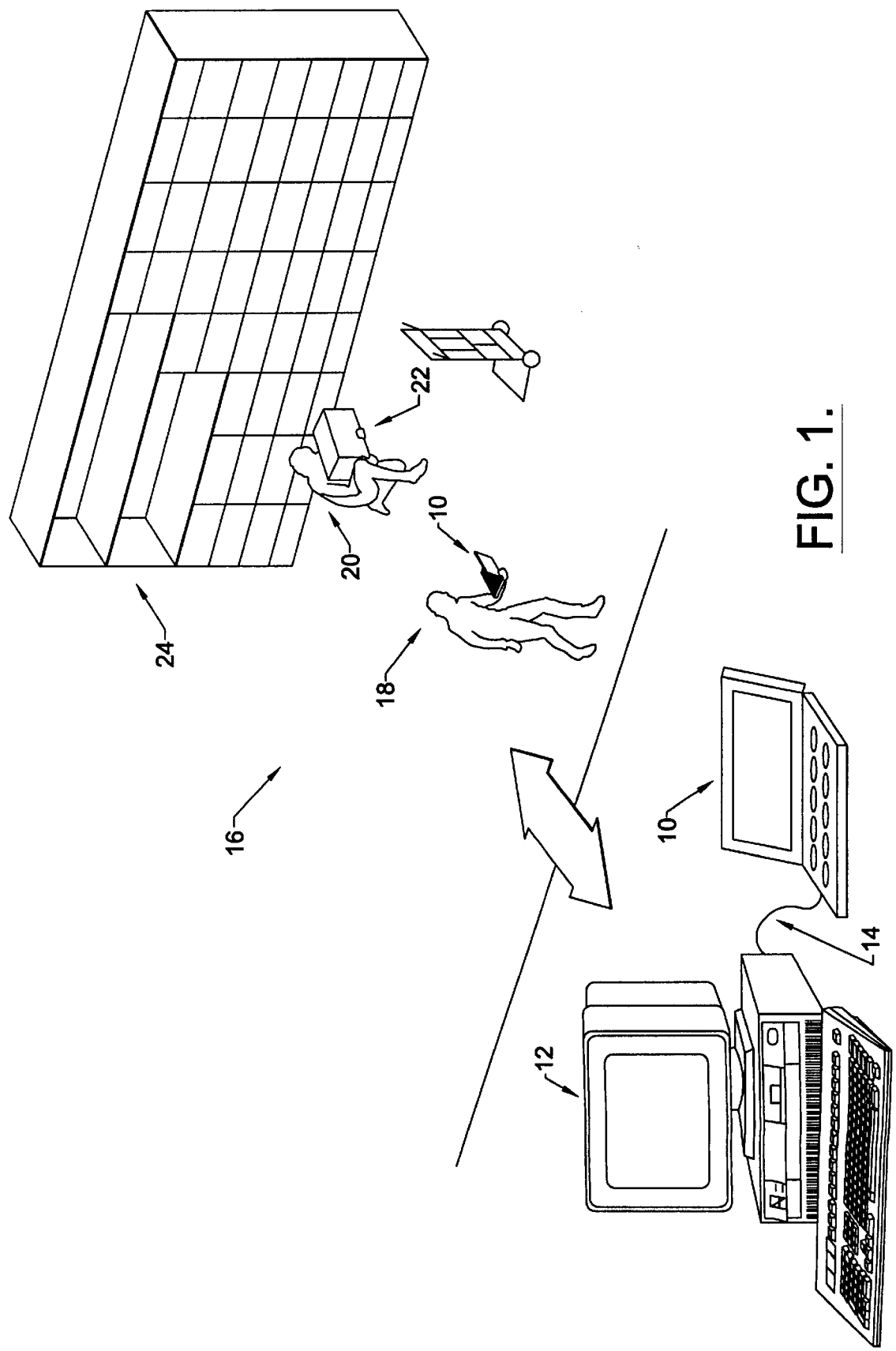
FIG. 1 is a schematic illustration of a data collection system in accordance with the present invention.

The present invention now will be described more fully hereafter with reference to the accompanying drawings, in which preferred embodiments of the invention are shown. This invention may, however, be embodied in many different forms. The present invention should not be construed as limited to the embodiments set forth herein; rather, these embodiments are provided so that this description will be thorough and complete, and will fully convey the scope of the invention to those skilled in the art. In the drawings, like numerals designate the corresponding parts throughout these several views.

As will be appreciated by one of skill in the art, the present invention may be embodied as methods, data processing systems or program products. Accordingly, the present invention may take the form of an entirely hardware embodiment, an entirely software embodiment or an embodiment combining hardware and software aspects. Further, the present invention can take the form of a computer program product on a computer-readable storage medium having computer-readable code means embodied in the medium. Any suitable computer-readable medium may be utilized including hard disks, CD-ROMs, optical storage devices, static random access memory devices, magnetic storage devices or any other suitable physical device capable of storing computer-readable code means.

With reference to FIG. 1, illustrated is the setup and use of a portable computing device 10 in accordance with the present invention. Briefly described, the portable computing device 10, such as a handheld or palmtop personal computer (PC) or mini-notebook computer, is configured to measure time and event data as part of a time and motion study. Utilizing a setup application program operating on a workstation 12, the appropriate configuration data can be generated and downloaded to the portable computing device 10 via a communication link 14. A data collection application program operating on the portable computing device 10 generates user interfaces for receiving various user-inputted data and information associated with the time and motion study being performed. The data collection application program may also accept inputs from interfaced devices such as portable global positioning systems, or other data acquisition systems. Thus, in a workplace 16, an analyst user 18 can record data and information associated with activities performed by a worker 20 utilizing the portable computing device 10. It should be noted that while worker 20 is depicted as a human in FIG. 1, a worker 20 may be a machine, apparatus, animal or other entity type capable of performing a measurable task or action.

For example, in a time and motion study the user 18 may be observing the worker 20 stacking goods 22 on a shelf 24 in order to gather data and information such as the elapsed time required for worker 20 to complete the activity of stacking, the number of goods 22 stacked, the location (or identity) of shelf 24, the identity of the worker 20 and the user 18, and the identity of the portable computing device 10, all of which may be recorded utilizing the portable computing device 10. Once the data and information has been collected and stored in the memory of the portable computing device 10, the data and information can be analyzed or audited using a number of commercially available software applications operating on the portable computing device 10, workstation 12, or another computer system to which the data has been transferred. Examples of application programs that may be utilized to study or analyze the data and information include Microsoft® Access and Excel (a trademark of Microsoft Corporation, Washington, USA).

Figure 2:
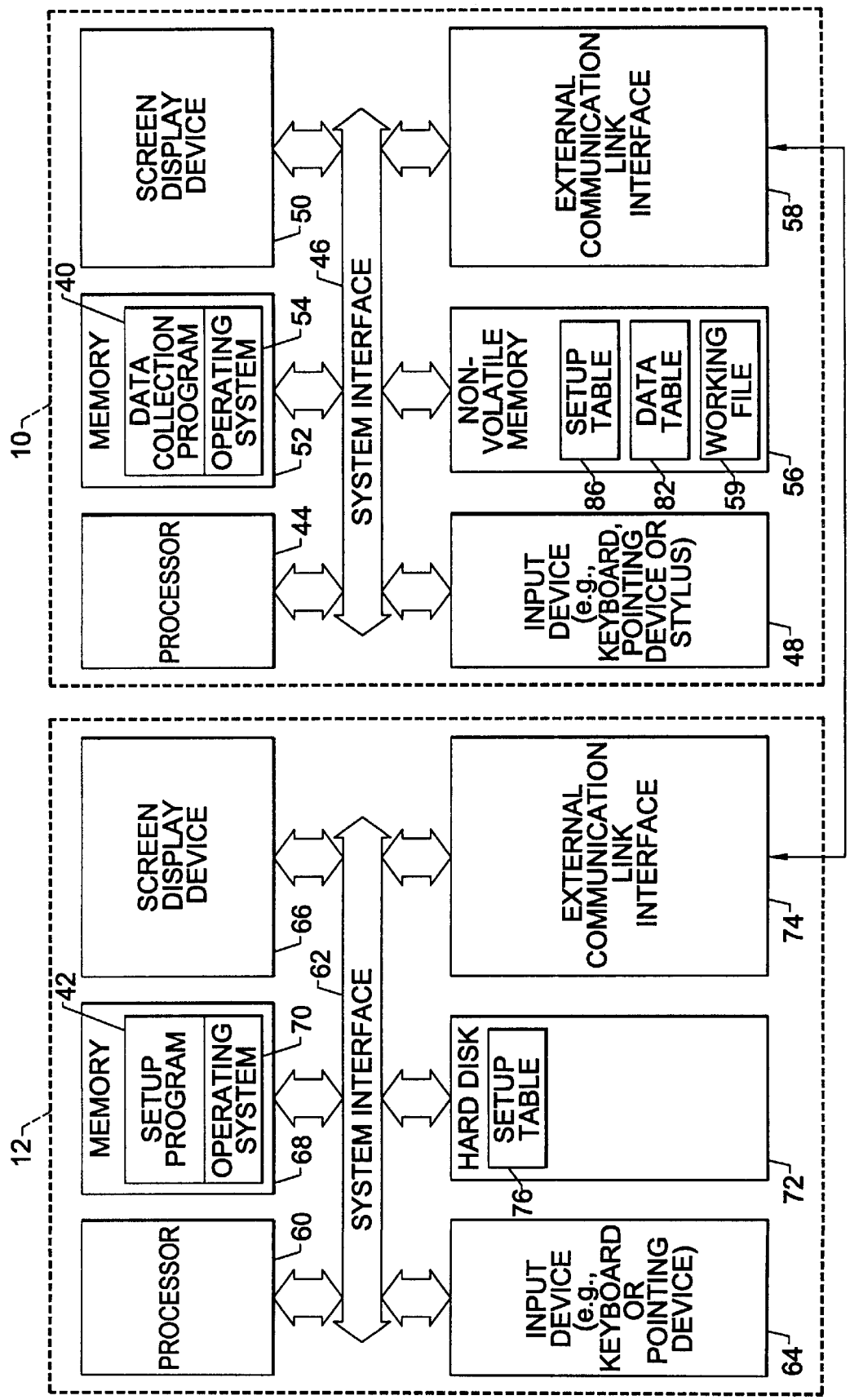
FIG. 2 is a block diagram illustrating a setup program and a data collection program in accordance with the present invention, wherein the setup program and the data collection program are situated within separate computer-readable mediums, for example, in the memories of respective computer systems.

A feature of the present invention is that the user interfaces generated on the portable computing device 10 can be extensively customized to the time and motion study to which they will be utilized. The user interfaces provide the user with menu selections and options that are pre-selected during setup. Since the user 18 is provided with customized lists of options or values during data collection, a minimal amount of effort is required on the part of the user to collect data. The user may easily select from the various options or values using, for instance, a pointing device or stylus (with a touchscreen) which takes little effort and time, and which can react quickly to the user's observation and input. Thus, the present invention enables a user to conduct time and motion studies without having to manually write down data and/or information on a data sheet. In addition, the setup program enables the user to define the text in many of the dialog boxes, buttons, and fields presented to the user via the user interfaces. Therefore, the present invention has wide application to virtually any type of time and motion study, regardless of the industry, because of its configurable nature and menu-driven operation. While the user interfaces disclosed herein are graphical, it will be appreciated by one of ordinary skill in the art that user interfaces in accordance with the present invention may take many different forms such as motion sensors, holographic, audio-based, etc., or any combination thereof FIG. 2 shows a block diagram illustrating examples of hardware-based computer systems for implementing the portable computing device 10 and the workstation 12. The portable computing device 10 includes a data collection program 40 in accordance with the present invention, and the workstation 12 includes a setup program 42 in accordance with the present invention. While the data collection program 40 and the setup program 42 are illustrated and described herein as operating on substantially separate systems, it will be appreciated by one skilled in the are that the data collection program 40 and the setup program 42 may operate on a single hardware-based computer system such as the portable computing device 10.

With reference to the portable computing device 10, a processor 44 communicates with the other elements within the portable computing device 10 via a system interface 46. The processor 44 has associated with it an internal clock equipped with a backup power source for keeping time/date information current during loss of the main power supply (e.g., batteries). An input device 48, for example, a keyboard, pointing device, touchpad (preferably supporting handwriting recognition software), microphone supported by voice recognition software, or touchscreen and stylus, is used to input data from the user. In a preferred embodiment, the portable computing device 10 supports a touchscreen which allows the user to input data via a stylist. A screen display device 50 is used to output data to the user. Preferably, the screen display device 50 offers at least one-half VGA resolution (i.e., 640×240 pixels of resolution). A memory 52 within the portable computing device 10 contains the data collection program 40. The data collection program 40 is in communication with a conventional operating system 54 for execution via processor 44. The portable computing device 10 also includes non-volatile memory 56 for providing persistent storage, and an external communication link interface 58 for communicating with remote devices such as workstation 12 via communication link 14. The communication link 14 may comprise any suitable medium for transferring data, such as infrared, radio frequency (e.g., cellular data, spread spectrum, fiber optic, or cabling). The non-volatile memory 56 may comprise a hard disk or solid state device, and may store various files or tables which may include a working file 59, a setup table 86 or a data table 82, all of which are described in detail hereinafter.

An example of a device suitable for operation as the portable computing device 10 is the HP 320LX (or 360LX) palmtop PC by Hewlett-Packard Company, Colorado, USA. The HP 320LX palmtop PC is based on a 32 bit RISC processor design, has a 640×240 pixel full-width display, and runs Windows® CE operating system. An example of a mini-notebook computer suitable for operation as the portable computing device 10 is the Libretto™ by Toshiba America, Inc. The Libretto™ is based on an Intel® Pentium® (both of which are trademarks of Intel Corporation, California, USA) processor, has a 640×480 pixel display, and runs Windows® 95.

It is noted that because of the miniature size of palmtop (i.e., handheld) PC's and mini-notebook PC's which are commercially available for implementing the portable computing device 10, such as those listed above, the portable computing device 10 can be easily carried around by a user without fatigue or inconvenience. These devices typically weigh less than two pounds, are sufficiently rugged and reliable, have more than adequate processing power and storage capacity, and include a display of a size that enables a sufficient amount of information to be presented to the user so that data entry can be streamlined via menu-driven user interface generated by the data collection program 40.

The workstation 12 includes the setup program 42, which is executed by a processor 60. The processor 60 communicates with the other elements within the computer system 12 via a system interface 62. An input device 64, for example, a keyboard or pointing device, is used by a user to input data to the workstation 12, and a screen display device 66 is used to output data to the user. A memory 68 includes the setup program 42 which communicates with a conventional operating system 70 for execution via the processor 60. The workstation 12 also includes a hard disk 72 which provides persistent, non-volatile memory, and an external communication interface 74 for communicating with external devices such as the portable computer device 10 via communication link 14. It should be noted that operating systems 54 of the portable computing device 10 and the operating system 70 of the workstation 12 are preferably window-based such as of MAC OS, Windows® 95 or NT, Windows® CE, or OS/2.

Stored on hard disk 72 is the setup table 76 which is generated by the operation of the setup program 42. The setup table 76 includes the configuration data generated by setup program 42, as will be discussed in greater detail below. The setup table 76 is communicated to the corresponding setup table 86 on the portable communicating device 10 via the communication link 14. The portable communicating device 10 receives the setup table 76 and stores the setup table 76 as the setup table 86 in the non-volatile memory 56, as shown. In addition, non-volatile memory 56 may include the data table 82 which is generated by the operation of the data collection program 40. The data table 82 comprises activity records for the activities observed by the user, as will also be discussed in greater detail below. The setup table 86 and data table 82 are preferably formatted as comma separated value files for use with open spreadsheets or relational databases. The working file 59 maintains the current setup and status information for a time and motion study session for reference in case of a power loss from, for instance, the portable computing device being accidentally turned off or the main batteries losing power, as will be discussed in greater detail below. It should also be noted that under certain circumstances, the workstation 12 and the portable computing device 10 may be one and the same, operating concurrently under the same operating systems, as will be obvious to those of ordinary skill in the art.

Setup

The setup program 42 of the present invention provides for the configurability and customization of the data collection program 40 that operates on the portable computing device 10. Thus, the portable computing device 10 can be customized for use in a vast array of contexts for performing time and motion studies. In particular, the setup program 42 enables the user to pre-define virtually all the dialogue text, menu options, list options, pushbutton text, user prompts, help screens and dialogue fields presented to the user 18 when performing a time and motion study with the portable computing device 10. Therefore, the user 18 can easily navigate through the data collection program 40 using the customized dialogue text, menu options, list options, pushbutton text, user prompts, help screens and dialogue fields which comprise the user interfaces of the data collection program 40. The user is not required to manually type or write down text or count information while observing an activity. The user 18 merely makes the appropriate selection from the pre-defined options and lists presented via the customized user interfaces using a stylus, mouse or other input device or means 48. This reduces the time and effort required by the user to record data, thereby allowing the user to direct more time and attention to the observation of the activity. The portable computing device 10 may also be interfaced with other data acquisition devices such as a sensor or global positioning system via the external communication link interface 58, as desired.

By way of example, with general reference to FIGS. 3–8, illustrated are examples of user interfaces in accordance with the present invention in the context of a beverage industry operation performing time and motion studies related to servicing point of purchase (POP) outlets for product route sales. However, as will be evident to one of ordinary skilled in the art upon reading of the following description, the present invention is extensively configurable and can be advantageously utilized in virtually any context for time and motion studies. Accordingly, the present description of a preferred embodiment is not to be taken in a limiting sense, but is made merely for the purpose of describing general principles of the invention.

Briefly described, the setup program 42 provides configurability to the present invention so that a user can customize the user interfaces displayed on the portable computing device 10 for virtually any time and motion study, regardless of the context. In particular, the setup program 42 enables the user to define profiles, each of which include a list(s) of related activities associated with a task. The user can also select various parameters for each activity for measuring and defining the activity. Further, pre-selected values or options may be defined for some parameters. The information inputed into the setup program 42 is processed into data structures that form setup tables 76. The setup tables 76 can then be downloaded to the portable computing device 10 via communication link 14.

Figure 3:
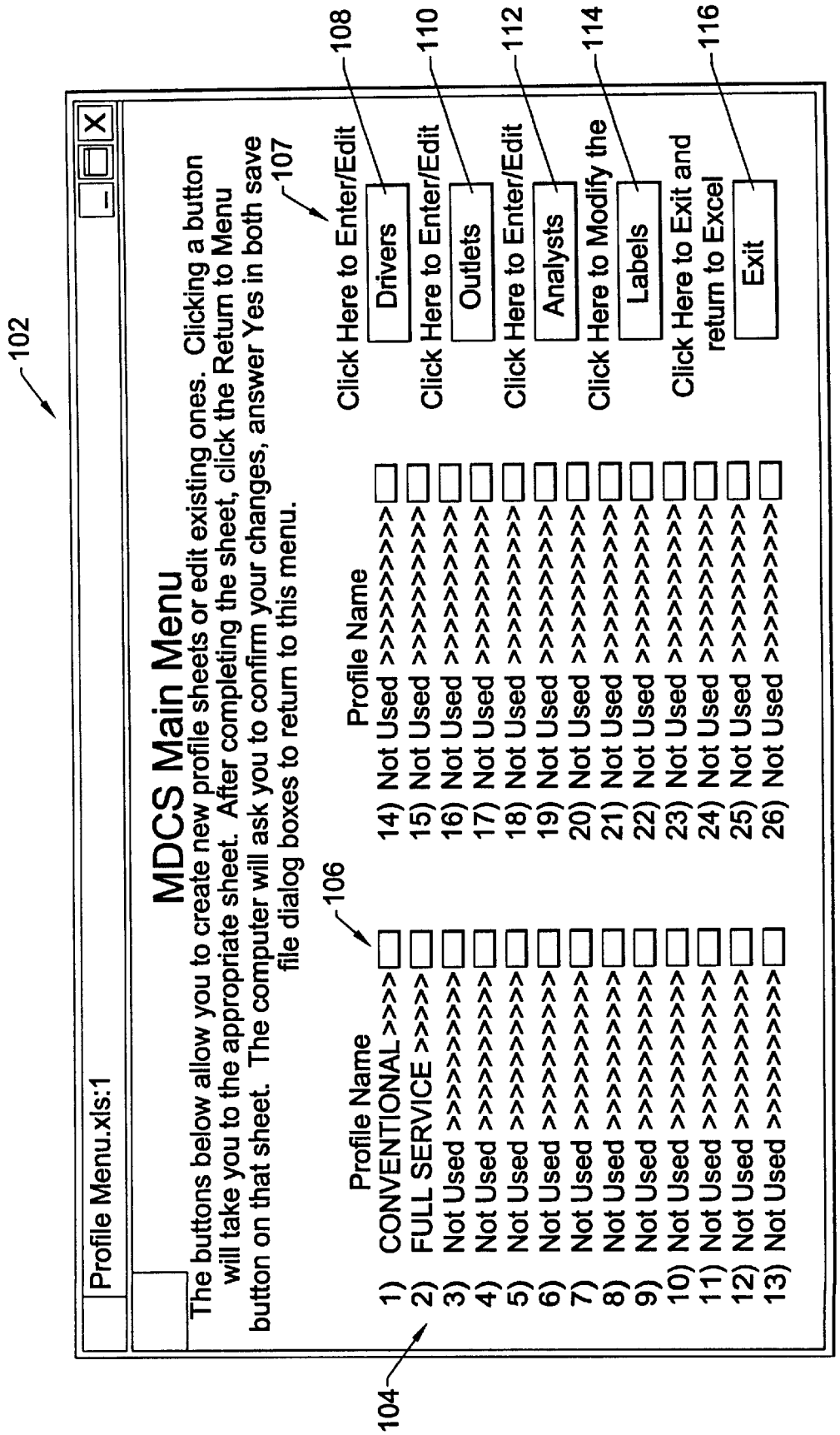
FIG. 3 is an example of a main menu user interface in accordance with the setup program of the present invention.

With reference now to FIG. 3, illustrated is a main menu window 102 presented to the user at the invocation of the setup program 42 via screen display device 66. From the main menu window 102, the user can select from a list 104 of existing profiles, or the user can create a new profile for configuration. As previously mentioned, a profile is a collection of related activities that comprise a task (such as servicing conventional POP outlets). As shown, a profile for Conventional outlets and another for Full Service outlets have already been configured, and the remaining profiles that are identified as not used are spare profiles for assignment to other outlet types as desired. The user can modify and/or edit one of these profiles, or create a new profile, by selecting the corresponding button 106. Also provided to user via the main menu window 102 are session identifiers 107 which can be individually configured to prompt the user for session identification data at the beginning of a time and motion study session. The session identifiers 107 include a drivers button 108, a customers button 110, and an analysts button 112. The session identification data is associated with the data and information collected using the data collection program 40 to identify the time and motion study session. The labels utilized for the data collection user interfaces also can be modified and/or edited by selecting the screen button 114 on the main menu window 102. The user may exit the main menu window 102 and close the setup program 42 by selecting the exit button 116.

Figure 4B:
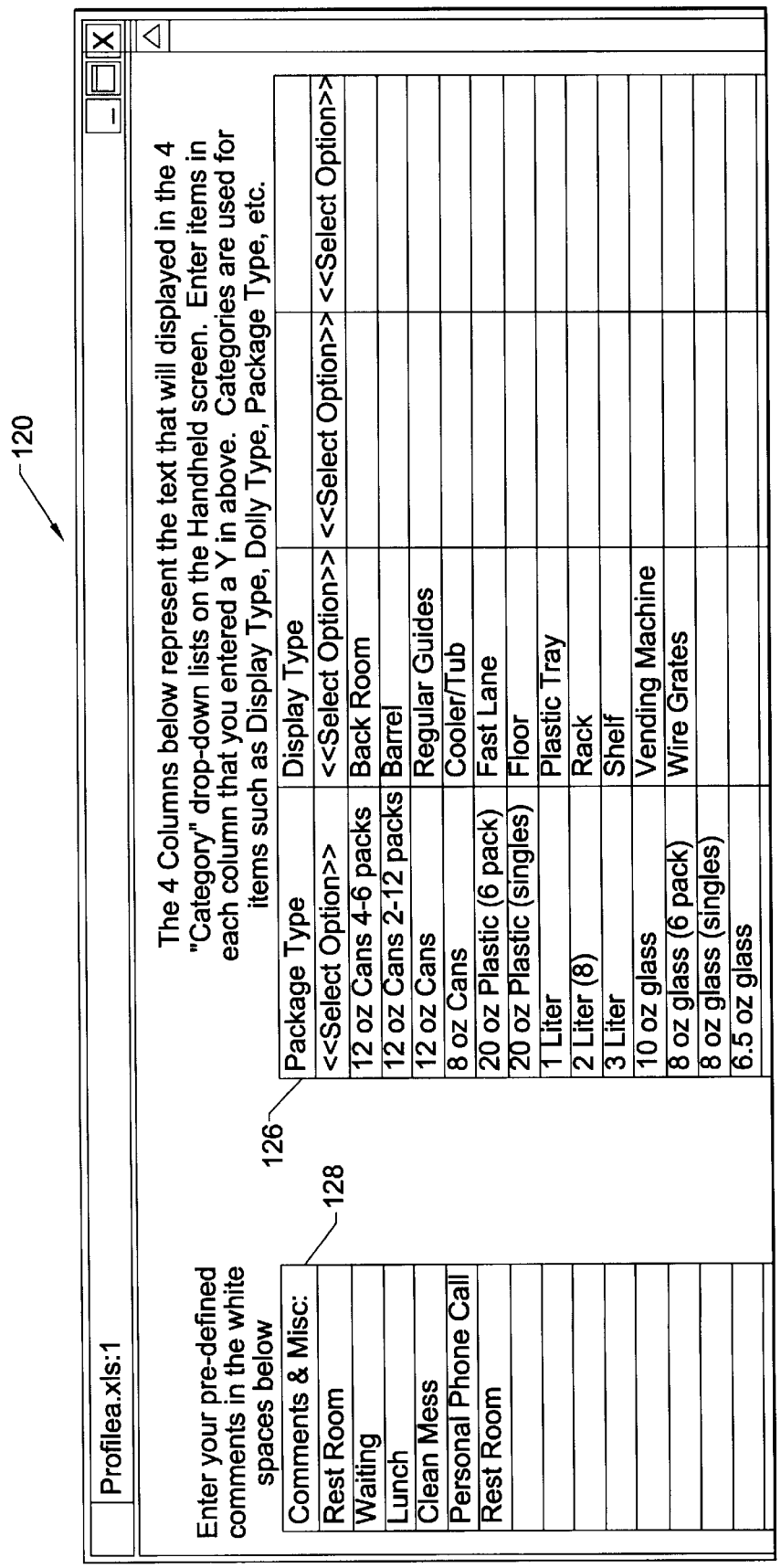

With reference to FIGS. 4A and 4B, illustrated is a profile sheet window 120 configured and identified as a Conventional profile. The profile sheet window 120 can be accessed by selecting the button 106 corresponding to the Conventional profile in the main menu window 102. FIG. 4A shows a top portion of the profile sheet window 120 and FIG. 4B shows a lower portion of the profile sheet window 120. The profile sheet window 120 identifies attributes of the profile identified in field 122, which for purposes of the present embodiment is a particular type of POP route. An action spreadsheet form 124 includes a list of actions or activities in the actions column. The list of activities is customized to include those that may be performed by a worker servicing the identified profile. Adjacent to the lists of activities are several columns identifying various parameters (e.g., Count Cases, Package Type, and Display Type) that may be associated with one or more of the listed activities. The activities are marked with a yes (Y), a label, or are left blank for each parameter to indicate whether or not that parameter should be associated with the activity, or to name the activity as it is to appear on the data collection user interface. Thus, for each activity which has a yes (Y) or a label indication for a particular parameter, that parameter will be presented to the user via a user interface on the portable computing device 10 when that activity is selected. A blank for a particular activity indicates that the activity will not have this parameter.

In FIG. 4B, which depicts the lower portion of the profile sheet window 120, a parameter spreadsheet form 126 provides a pre-selected list of options or values for each of the parameters listed in the action spread sheet form 124. The user can edit or modify this list so that the list of values for each parameter is customized to the time and motion study to be performed. Thus, if the user selects the activity of Facing/Rotating, as listed in the action spreadsheet form 124, the user will be prompted via a user interface on the portable computing device 10 to define the package type parameter and display type parameter. The user will be presented with the pre-selected values from the parameter spreadsheet form 126 to select the package type and the display type. The list of values may be presented to the user of the portable computing device 10 via a menu list, list box or another suitable data format.

In addition, a comment spreadsheet form 128 provides a list of pre-selected comments to be presented to the user via the user interface of the portable computing device 10. Thus, the user can select from the pre-selected list of comments rather than having to manually type a comment. As with the other spreadsheet forms described above, the comment list can be edited or modified to be customized for the time and motion study to be performed. Advantageously, this provides for more standardized comments which may result in more useful data. Alternatively, the user will be allowed to manually type or otherwise enter a comment into the portable computing device 10 that does not appear in the pre-selected list of the comment spreadsheet form 128.

It is noted that the count parameter of the action spreadsheet form 124 does not have an associated list of values in the parameter spreadsheet 126. Rather, the counter parameter has associated with it a data input box that is presented to the user of the portable computing device 10 via a user interface for tracking a count. The user will be able to key in, enter, or increment and decrement the data input box to reflect the observed count number corresponding to the activity being performed by the worker, as will be discussed in more detail below.

Once the profile has been edited or modified as desired, the user can save the changes and return to the main menu window 102 by selecting the save and exit button 130 in FIG. 4A. The user may then select another profile to edit or modify as desired, or create a new profile.

Figure 5:
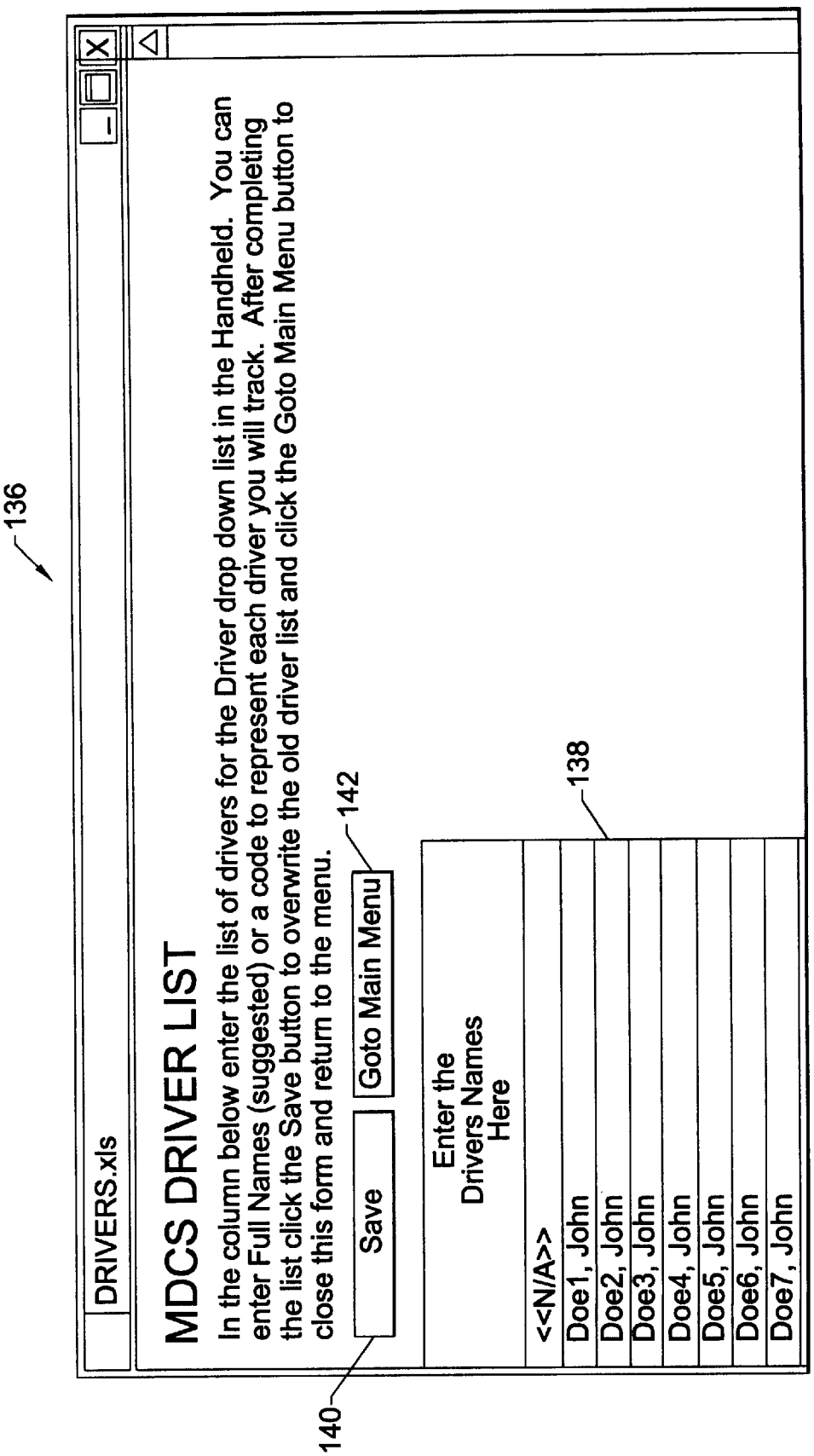

In addition, from the main menu window 102, the user may configure the session identifiers 107 to provide the user 18 with pre-selected values for each of the session identifiers. For instance, by selecting the drivers button 108 of the main menu window 102, the user is presented with a driver list window 136, as illustrated in FIG. 5. The driver list window 136 includes a driver spreadsheet form 138 which comprises a list of drivers or other persons being observed for the time and motion study. The user can edit or modify the list of drivers in order to customize the list as desired. This list becomes the pre-selected list of drivers that appears on the portable computing device 10. Alternatively, the user will be allowed to manually type or otherwise enter a driver name into the portable computing device that does not appear in the pre-selected list of drivers. When complete, the user can save the driver list by selecting the save button 140, and return to the main menu 102 by selecting the main menu button 142.

In similar fashion, the user can select the outlets button 110 of the main menu window 102 to navigate to an outlet information window 144, as illustrated in FIG. 6. The outlet information window 144 includes an outlet spreadsheet form 145 which comprises a list of outlet names and route numbers for the bottler conducting the time and motion study. The outlet spreadsheet form 145 can be modified or edited so as to customize the list as desired. In circumstances where the amount of information contained in the outlet spreadsheet form 145, or any of the other spreadsheet forms, is too large to be manually entered, then the information can be imported into the spreadsheet form 145 from an external source. For example, data can be cut or copied from one program application such as a spreadsheet containing a list of outlets, and then pasted into the appropriate area of the outlet spreadsheet form 145. When complete, the user can save the outlet list by selecting the save button, and return to the main menu window 102 by selecting the main menu button.

Figure 7:
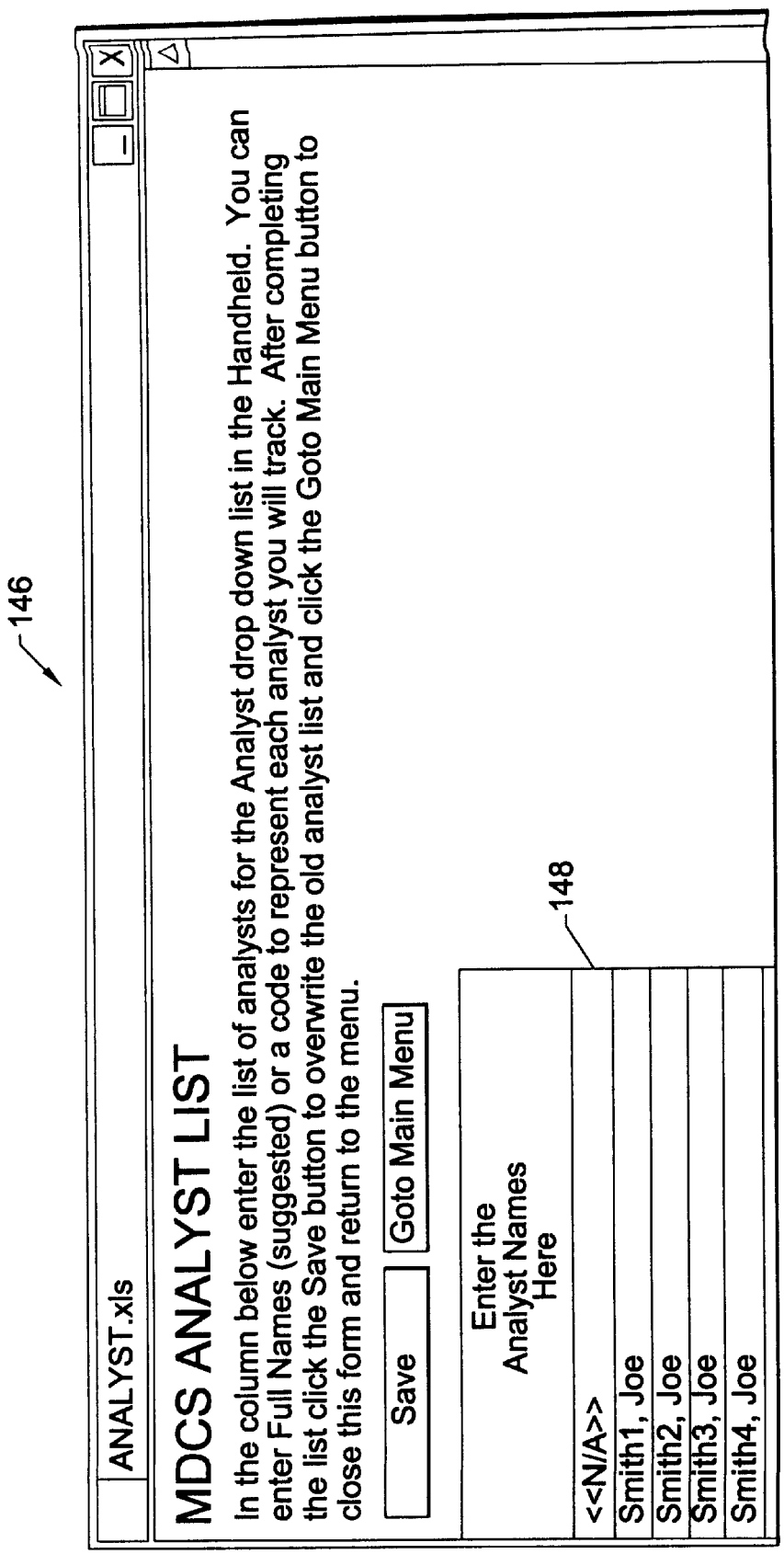

By selecting the analysts button 112 of the main menu window 102, the user is presented with an analyst list window 146, as illustrated in FIG. 7. The analyst list window 146 includes an analyst spreadsheet form 148 which comprises a list of analyst (i.e., data collection users) for performing the time and motion study. The user can edit or modify the list of analysts so as to customize the list as desired. This list becomes the pre-selected list of analysts that appears on the portable computing device 10. Alternatively, the user will be allowed to manually type or otherwise enter an analysts name into the portable computing device that does not appear in the pre-selected list of analysts. When complete, the user can save the analysts list by selecting the save button, and return to the main menu window 102 by selecting the main menu button.

To yet further customize the user interfaces presented during the operation of the data collection program 40, the user may modify the labels utilized to generate the user interfaces by selecting the labels button 114 of the main menu window 102 to navigate to a label list window 150, as illustrated in FIG. 8. The label list window 150 comprises a label spreadsheet form 152 which includes a list of text labels and a list of associated descriptions for each label. The user can edit or modify the labels so as to customize the text that is to appear on the user interface of the data collection device 10. When complete, the user can save the modified label list spreadsheet form 152 by selecting save button 154, and return to the main menu window 102 by selecting the main menu button 156.

Once a user has made the desired modifications to the profiles, session identifiers, and screen labels, then the user may exit the setup program 42 by selecting the exit button 116 of the main menu window 102. Upon exiting the setup program 42, the information included in the profile label field 122 and spreadsheet forms 124, 126, 128, 138, 145, 148, and 152 is used to generate the setup table 76 stored in non-volatile memory 72. In particular, each one of the spreadsheet forms is saved in two different formats, wherein both formats preferably contain the same setup data. A first format is as a Microsoft® Excel (.xls) file for presenting the information to the user. The Excel file includes the explanation text and formatting (including hidden fields and macros) which present the information to the user as shown in FIGS. 3–8. A second format is as a textual comma separated value (.csv) file for use by the data collection program 40 for generating the user interfaces on the portable computing device 10. The textual comma separate value files comprise the setup table 76 on the workstation 12 and the setup table 86 on the data collection device 10. An example of a text comma separated value file which comprises either of the setup tables 76, 86 is provided in FIG. 9. FIG. 9 shows a comma separated value file 158 corresponding to the label list spreadsheet 152. Accordingly, the setup table 76 comprises one or more comma separated value files that include customized information inputted to the setup program 42.

The information contained in the setup table 76 is transferred to the corresponding setup table 86 in the portable computing device 10 via the communication link 14 where the information from setup table 86 is utilized to generate customized user interfaces. It should be noted, however, that under certain circumstances the setup table 76 may not need to be transferred to another device to be accessed by the data collection program 40. For instance, the setup program 42 may be execute on the portable computing device 10 so that the setup table 76 generated is local to the data collection program 40.

As illustrated by the profile sheet window 120 and the above discussion, the setup program 42 is intuitive to use because of its utilization of basic fill-in-the-blank spreadsheet forms that can be easily edited and/or modified. Thus, a user of the setup program 42 does not have to be a computer programmer to customize user interfaces appearing on the portable computing device 10.

Data Collection

The data collection program 40 is executed on the portable computer device 10. The data collection program 40 is configured to read the data from the setup table 86 and to generate therefrom user interfaces that are customized for the time and motion study to be performed. The customization of the user interfaces allows the user 18 to exert a minimum amount of effort in identifying the activity being performed by the worker, and to further defining the activity through various parameters associated with the activity. Thus, the user 18 may able to record time and event data quicker and more efficiently than with a stopwatch and clipboard.

The data collection program 40 is configured to generate a data table 82 which is preferably a comma separated value (.csv) file configured for use with a relational data base or spreadsheet. The data table 82 is stored in the non-volatile memory 56 associated with the portable computing device 10. The data table 82 includes a plurality of activity records recorded during a time and motion study session. When the time and motion study is complete, the data table 82 can then be accessed and utilized by a variety of window-based tools such as Microsoft® Access or Excel, or Crystal Reports® for analysis.

With general reference to FIGS. 10–17, illustrated are examples of user interfaces generated by the data collection program 40. As with the setup, the following description is of an embodiment configured for a time and motion study by a beverage industry operation in connection with servicing POP outlets.

Figure 10:
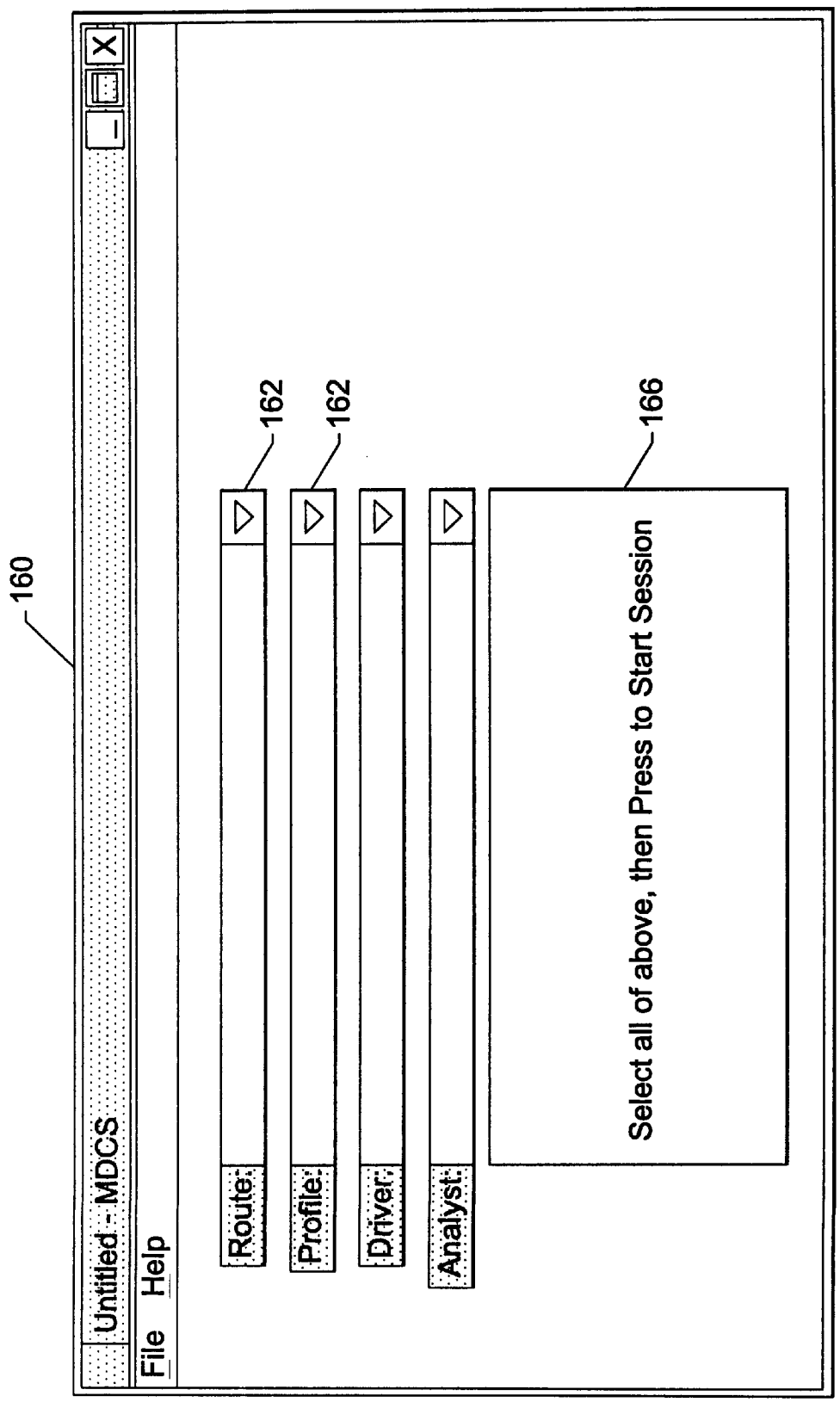
FIGS. 10 and 11 are examples of a session startup user interface in accordance with the data collection program of the present invention.
Figure 11:
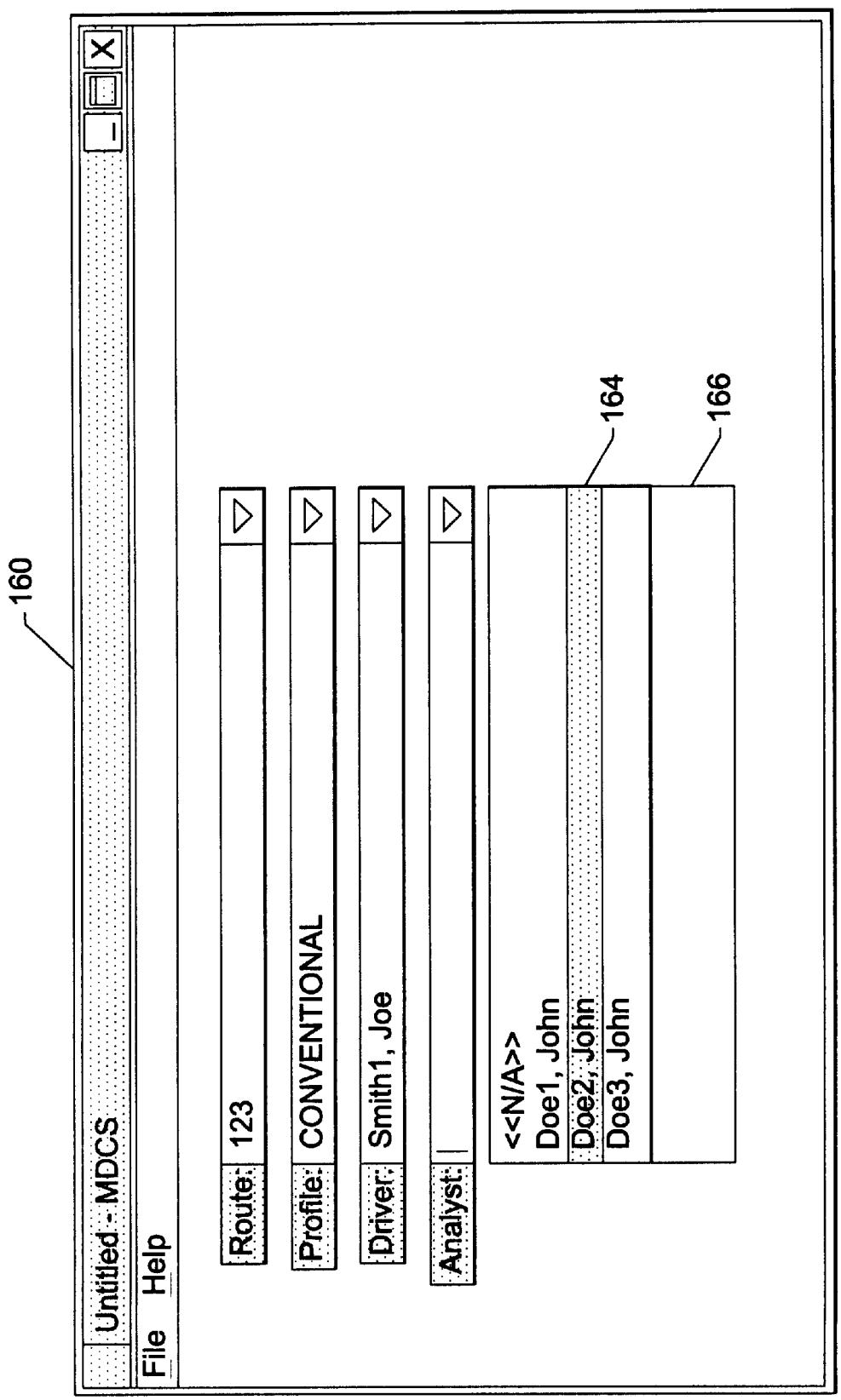

At invocation of the data collection program 40, a session identifier window 160, as illustrated in FIG. 10, is presented to the user 18 via screen display device 50 (FIG. 2). The session identifier window 160 prompts the user to identify the activity profile and session identifiers for the time and motion study to be performed. The user may type in the appropriate information or select one of the downward buttons 162 adjacent to the appropriate field to view a box list of the pre-selected values defined for that item during setup. For example, as illustrated in FIG. 11, a box list 164 provides the user with the names of the analysts listed in the analyst spreadsheet form 148 of the analyst list window 146 (FIG. 7). Once the profile, route, driver and analyst have been identified, then the analyst may begin the time and motion study session by selecting the start session button 166.

Figure 12A:
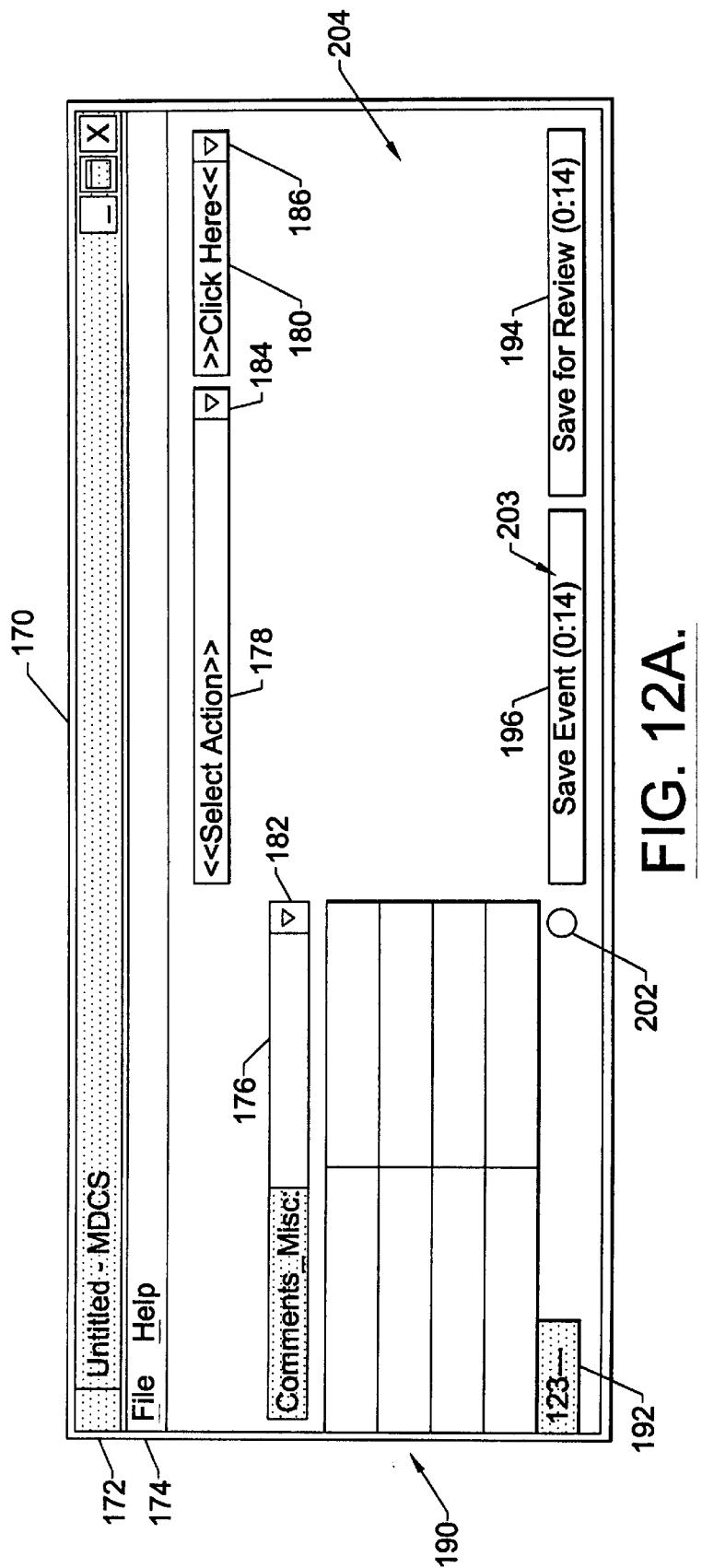
FIGS. 12–17 are examples of a data collection user interface in accordance with the data collection program of the present invention.
Figure 12B:
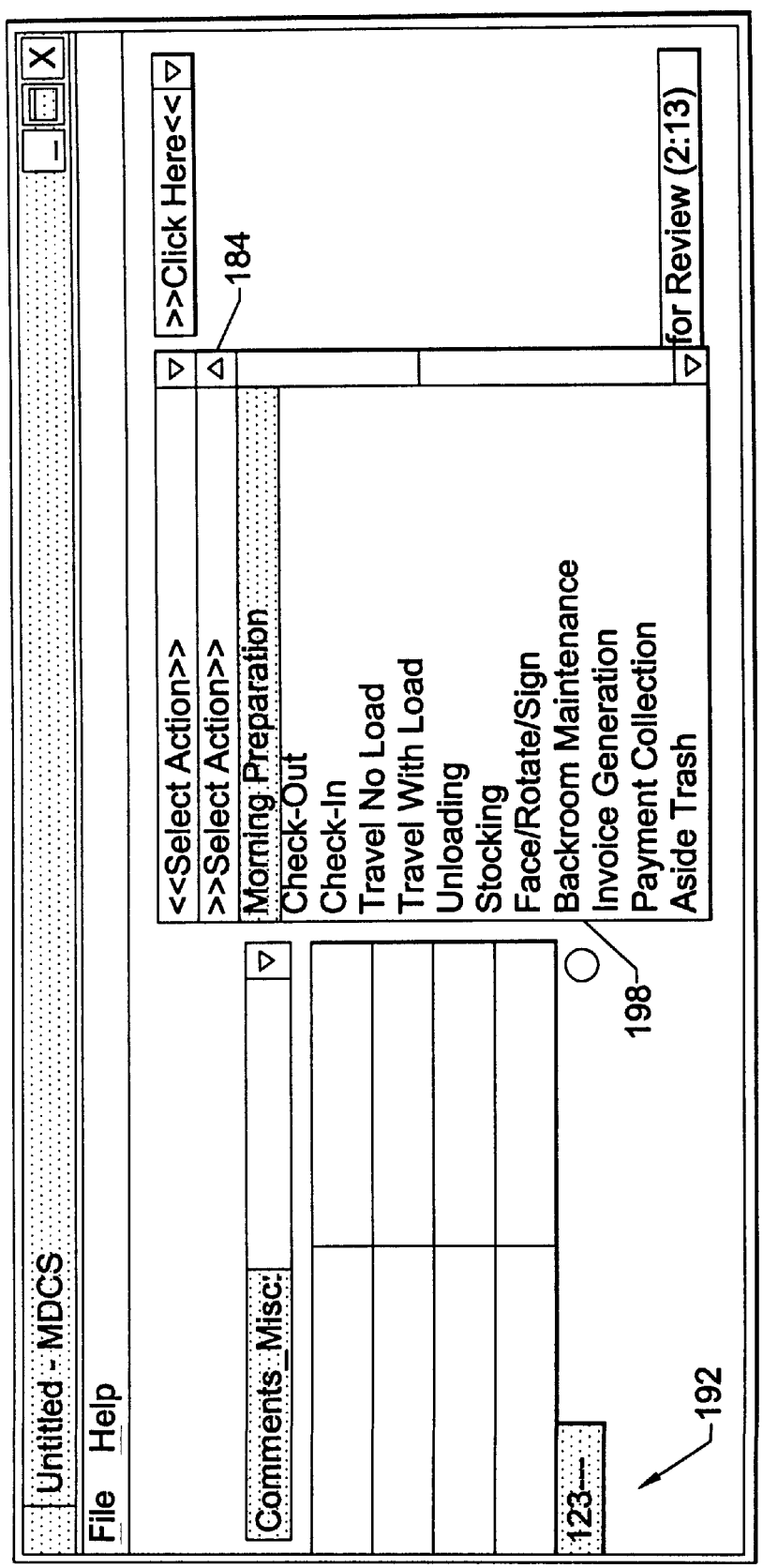

Upon selecting the start session button 166, the portable computing device 10 begins tracking time, and will continue to do so until the end of the time and motion study session. In response to selecting the start session button 166, the user 18 is presented with a data collection window 170, as illustrated in FIG. 12A. The data collection window 170 may or may not include a title bar 172 and menu bar 174, as are well known in window-based programs. The data collection window 170 also includes several fields by which the user is able to input time and motion study data and information to the data collection program 40. In particular, a comment field 176 provides for comments by manually entering (e.g., typing or writing) in a comment or by selecting a comment from the pre-selected values defined during setup in the comments spreadsheet form 128 of the profile sheet window 120. The pre-selected values can be accessed by selecting the corresponding downward button 182. In addition, the activity (or action) field 178 provides for the identification of the activity being performed by the worker 20. The user can choose from the pre-selected list of activities defined during setup in the action spreadsheet form 124 of the profile sheet window 120. The pre-selected list can be accessed via a list box 198 by selecting the corresponding downward button 184, as shown in FIG. 12B.

Figure 13A:
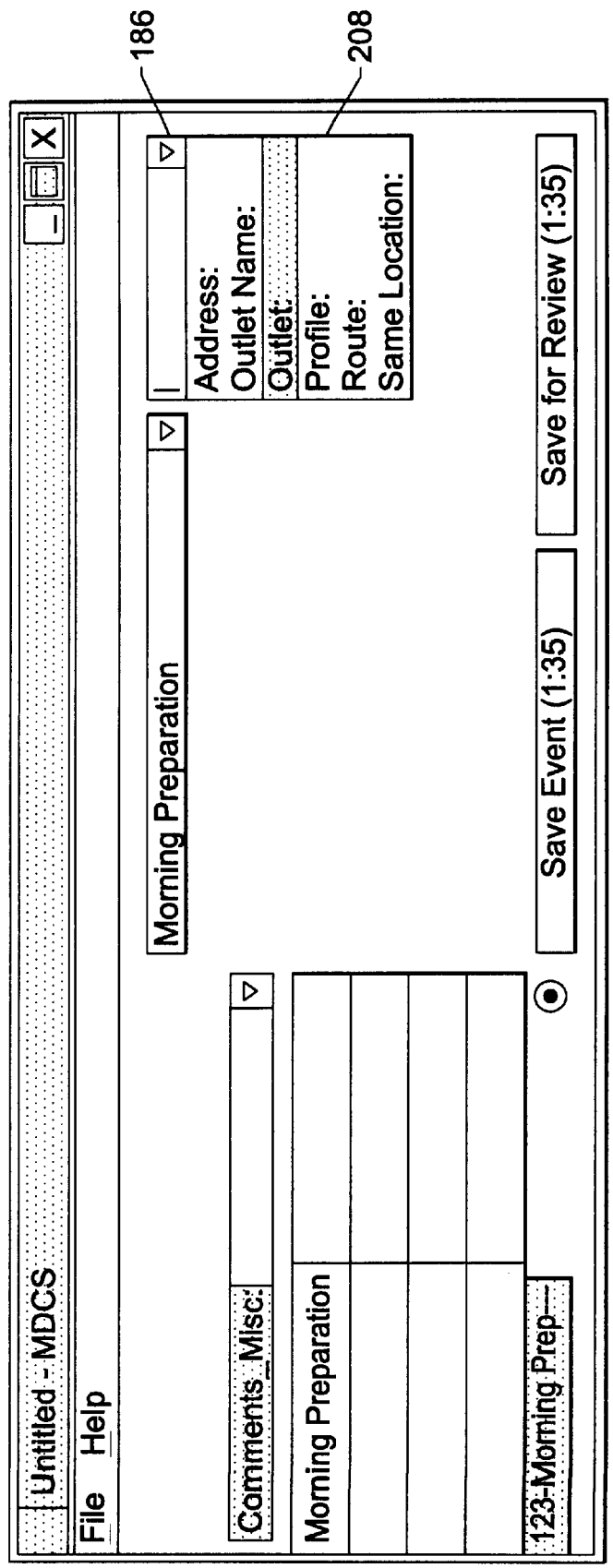
Figure 13B:
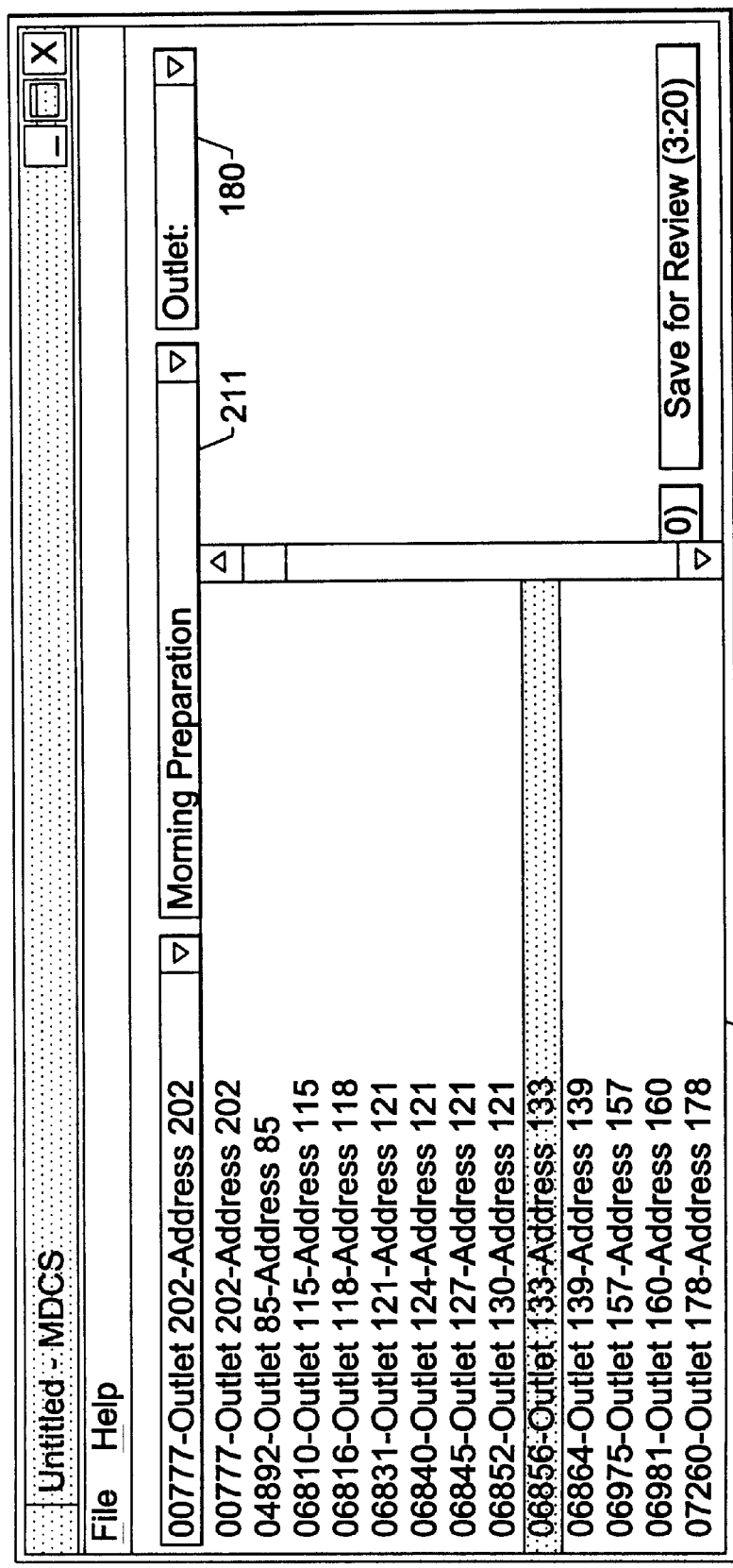

The outlet selector field 180 provides for the selection of a new outlet within the current route, or another route or profile that is different from the one first chosen in the session identifier window 160, or updated subsequently by selecting a new outlet, route or profile from outlet selector field 180. As illustrated in FIG. 13A, the outlets, route numbers and profiles may be accessed for selection via a list box 208 by selecting corresponding downward button 186. In the example shown in FIG. 13A, if outlet is selected in the list box 208, then the user interface of FIG. 13B is generated, wherein outlet appears in the outlet selector field 180, list box 208 disappears, and list box 210 drops down from the new outlet information filed 211. In FIG. 13B, the outlets or route number presented to the user for selection via the list box 210 are defined in the outlet spreadsheet form 145 of the outlet information window 144 during setup.

Figure 14:
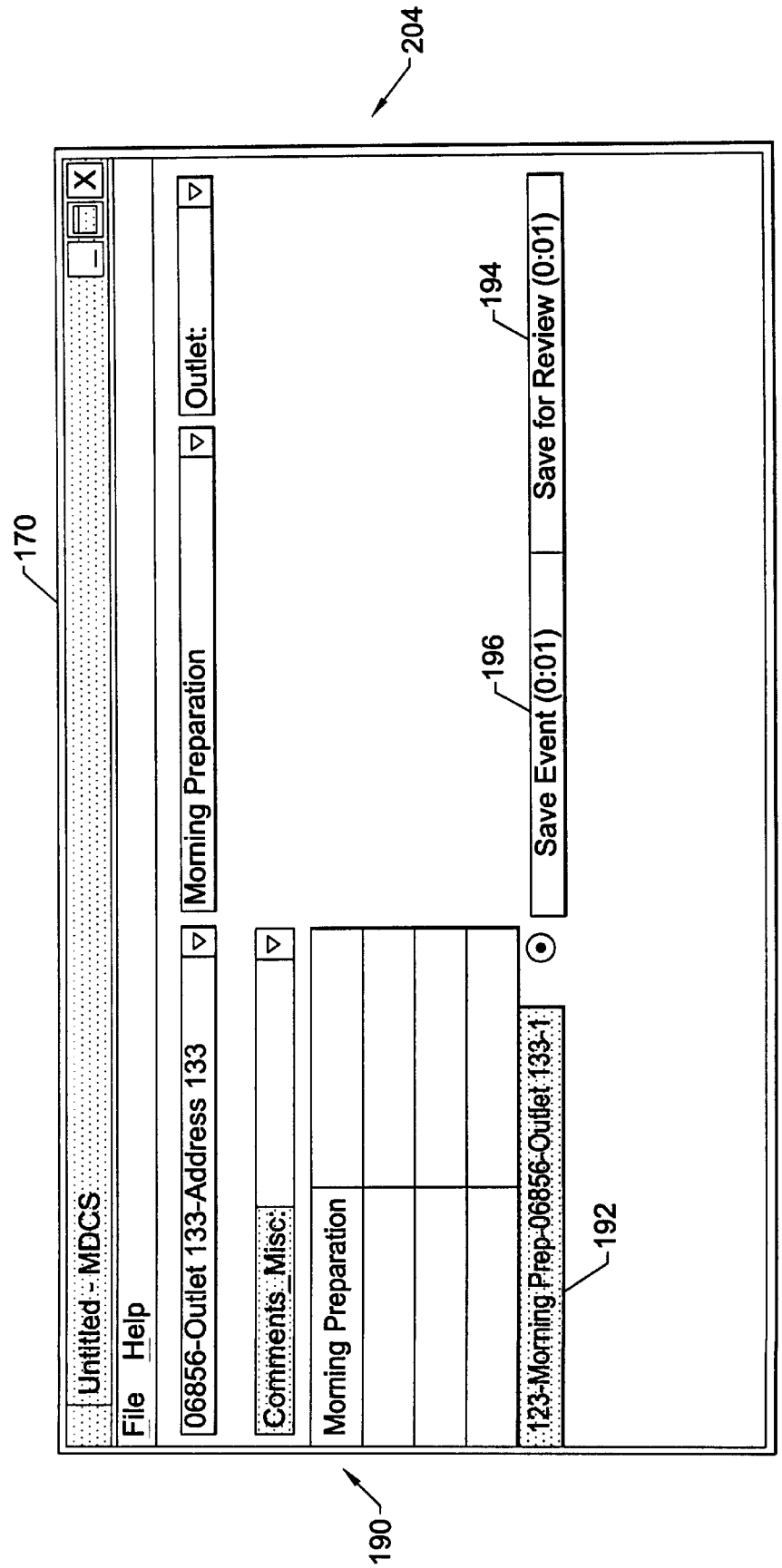
Figure 15:
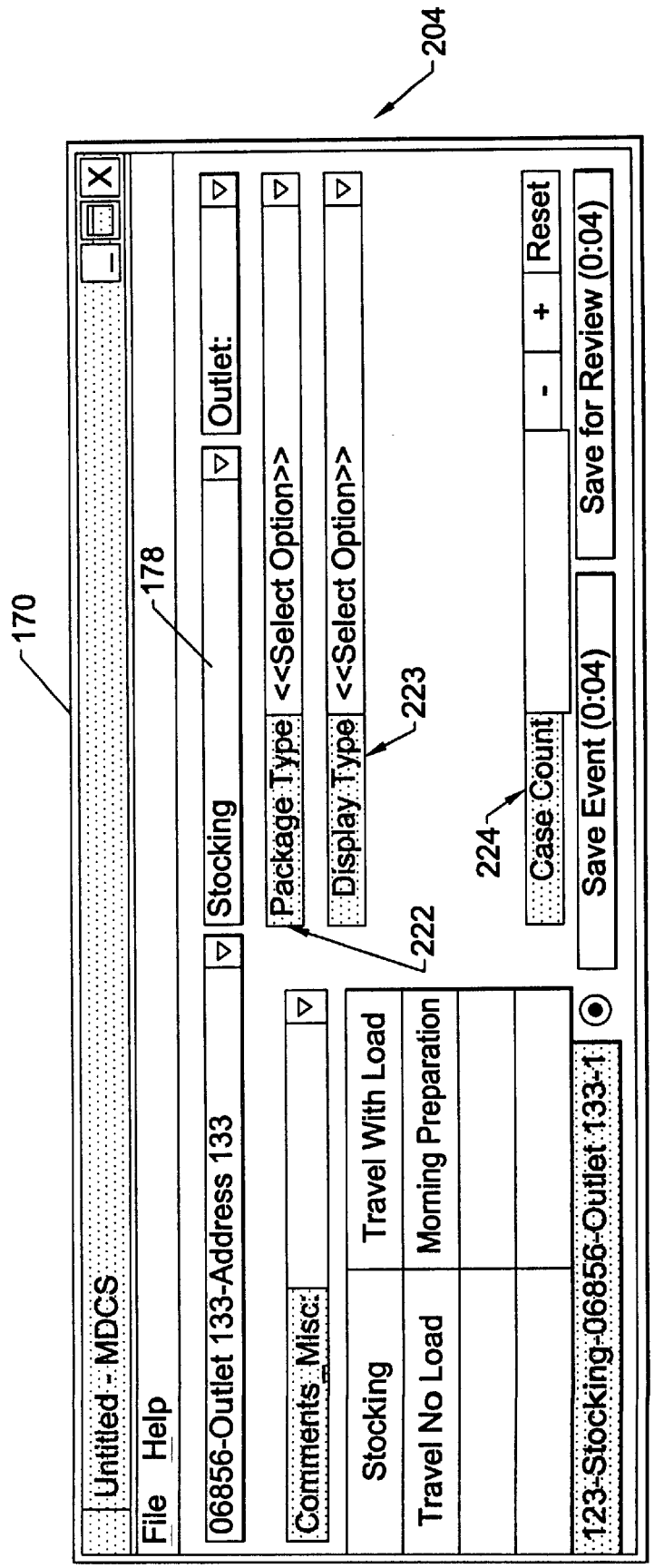

The data collection window 170 also provides for most recent buttons 190 which display the activities most recently selected during the current time and motion study session. Thus, at the beginning of the time and motion study session, prior to the identification of the first activity being observed, no activities are listed on the most recent buttons. Otherwise, as illustrated in FIG. 14, after a first activity has been selected (e.g., Morning Preparation), that activity appears as an option as one of the most recent buttons 190. Thus, the user can quickly reselect an activity utilizing the most recent button when the activity re-occurs during a study session rather than using activity field 178. It is noted that the parameters associated with an activity occurring for the second time within a study session may have the previously recorded values as defaults, depending upon the particular parameter.

A status line 192 appears below the most recent buttons 190, and includes information selected for the current activity, including the current route, action or activity, outlet, outlet name, and other outlet information such as channel number. The status line 192 is preferably for information display only. The data shown in the status line 192 may or may not be editable elsewhere in the data collection window 170 or the session identifier window 160.

A save event button 196 is provided to note the end of one activity and the beginning of a next sequential activity. The user presses the save event button 196 the instant that the current observed activity ends, and another activity begins. By selecting the save event button 196, the identified activity and the associated parameters, the elapsed time for the activity, the current time and date from the internal clock in the data collection device, count (if appropriate) and comments (if any were entered) are written out as an activity record to the data table 82. In particular, the data table 82 is opened, appended with the new activity record, and then closed. The save event button 196 includes a reference clock 203 which displays an elapsed time since the beginning of the current observed activity. The reference clock 203 is reset and restarted each time the save event button 196 is selected. In addition, adjacent to the save event button 196, a blinking radio button 202 is provided to indicate the passing of time.

A save for review button 194 is provided for marking an activity record for later review or comment. The save for review button 194 causes the data collection program 40 to save the current activity to data table 82, essentially the same as the save event button 196. However, save for review button 194 does one thing differently from save event button 196: the save event button 196 marks the current activity so that the associated activity record can be identified. In particular, save for review writes a yes to the review field for the activity record in data table 82. This is shown in FIG. 18, element 240. The records marked yes are easy to find during a review of the data table 82.

It is important to note that the user can identify and change the activity being performed anytime prior to the end of an activity. Since it is usually difficult for the user to determine what activity the worker 20 is engaged in at the beginning of an activity, the data collection program 40 allows the user to begin timing an activity before an activity is identified. The user has until the end of the activity, that is, prior to selecting the save event button 196, to identify and select an activity from either the field 178 or the most recent buttons 190. It is not until the save event button 196 is selected that the identified activity, parameters, elapsed time, time and date, comments, etc. are captured and written to the data table 82 as an activity record. If the user happens to erroneously select a wrong activity or parameter, or has not completed selection of all the parameters, then the user can select the save for review button 194 at the end of the current activity to mark it for future reference so that the user can later locate the incorrect or incomplete activity record (as shown in FIG. 18) to correct any inaccuracy or to make any additional notations within the data table shown in FIG. 18.

The data collection window 170 includes a parameter field 204 where the dialog boxes are located for requesting the user to input data relating to a parameter associated with the activity identified in the activity field 178, as defined during setup using the profile sheet window 120. For instance, with reference to FIGS. 15, 16A and 16B, the activity of stocking is identified in the activity field 178. The parameters of Package Type, Display Type, and Case Count were associated with the activity of stocking during setup using the profile sheet window 120 (FIG. 4A), and are prompted for via a package type field 222, a display type filed 223, and a case counter 224. As particularly shown in FIG. 16A, a box list 212 of pre-selected values for the parameter Package Type can be displayed so that the user can quickly select the appropriate package type. It is also noted that the values presented to the user in list box 212 are those defined for Package Type in this case during setup using the parameter spreadsheet form 126 (FIG. 4B). In substantially the same manner, the display type field 223 can be selected by the user.

Figure 16A:
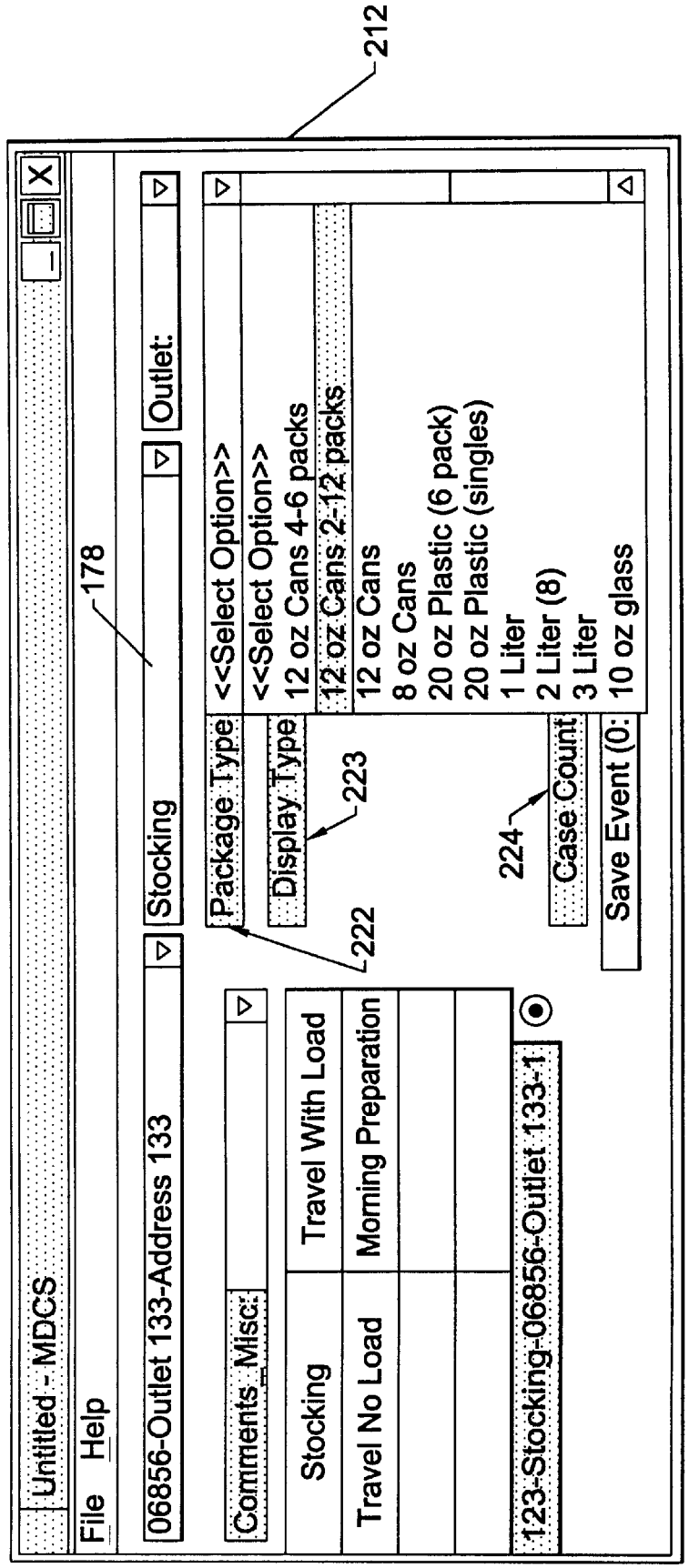
Figure 16B:
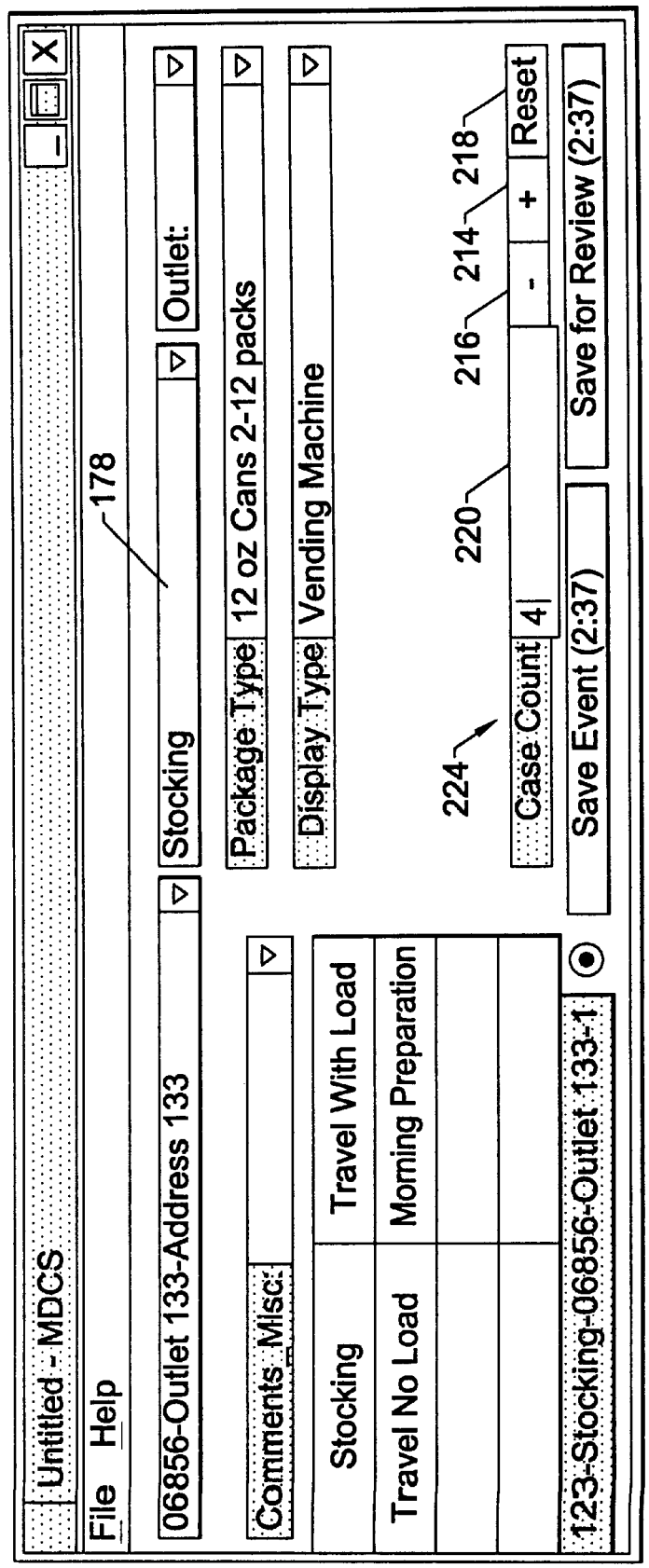

As particularly shown in FIG. 16B, a case counter 224 prompts the user to enter the count by selecting a plus button 214 or a minus button 216 to increment or decrement the appropriate number of cases stocked. The increment and decrement units are preferably one. The case counter 224 is preferably configured to count in integers or decimal numbers from zero to ten thousand or more. A reset button 218 is provided to return the count to the default value of one. As an alternative to using the plus button 214 and the minus button 216, the user can activate field 220 so that the appropriate count number can be typed into field 220, or the user can paste a count value of one from another concurrently running program application such as a data collection device or a calculated value from a spreadsheet.

Figure 17:
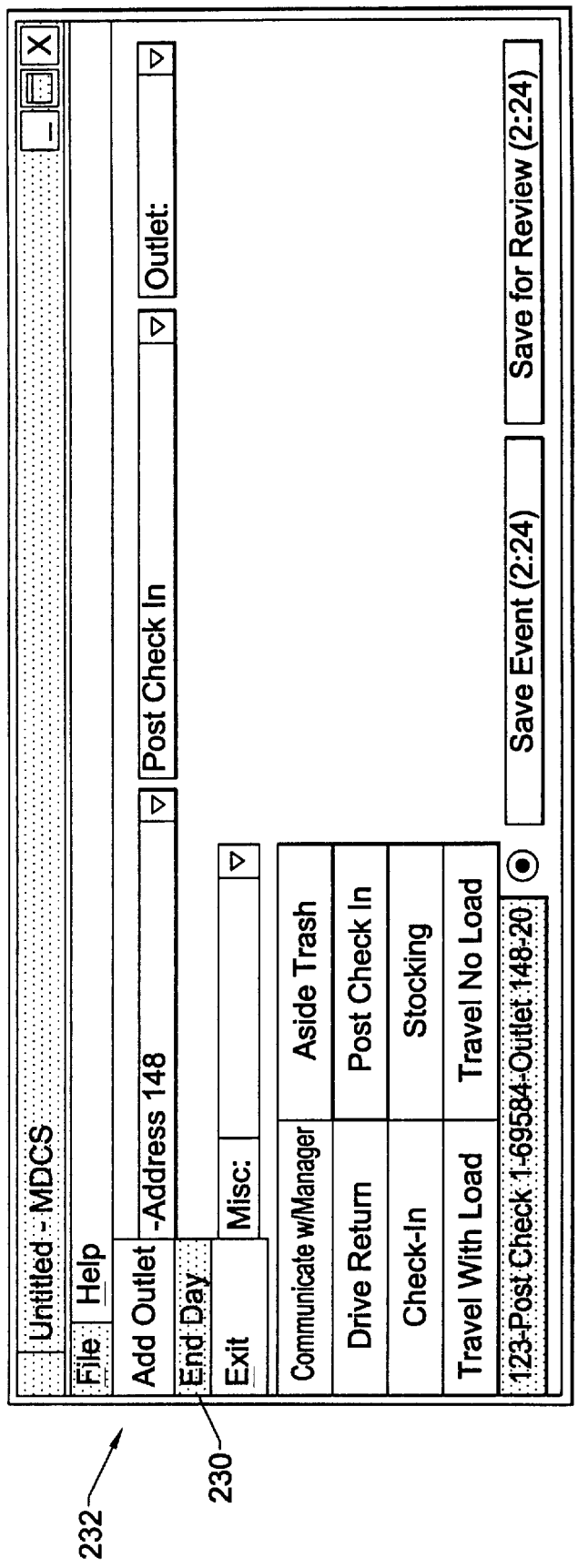

When the user selects the save event button 196, or save for review button 194, the data collection program 40 captures the activity identified in the activity field 178, the parameters selected in the parameter field 204, the comment (if any) in the comment field 176, and a save for review mark (if selected). The captured data and information is saved as an activity record with the time information captured by the data collection program 40. The time information, in the preferred embodiment, comprises a beginning time which either coincides in time with the beginning of the study session or with the previous selection of the save event button 196 (or the save for review button 194), and an end event time which coincides in time with the current selection of the save event button 196. Further, the end event time alternatively may be indicated by the selection of the end day menu item 230 associated with the file menu 232, as illustrated in FIG. 17. Selecting the end day menu item 230 also ends the current session by stopping the event timer. The time information stored with the activity record may include an elapsed time calculated from the activity start and end times, and the time and date of the end time. Thus, each time the save event button 196 is selected, the data table 82 is opened, appended with another activity record, and then closed. When the end day button 230 is selected, the final activity record for the session is written to data table 82.

An example of a data table 82 generated by the data collection program 40 is provided in FIG. 18. As previously mentioned, the data table 82 is preferably formatted as a comma separated value (.csv) file for use with spread sheets and relational databases, as is well known to those of ordinary skill in the art. As a comma separated value file, the data table 82 can be viewed by the user to verify measurements, add to or modify the comments, or change the user entered information. In addition, comma separated value files are compatible with numerous commercially available analysis tools such as Microsoft® Access and Microsoft® Excel, which may operate on either of the portable computing device 10 or the workstation 12. The illustrative data table 82 shown in FIG. 18 is generated using Microsoft® Excel, which interprets the comma separated value (.csv) formatted data table as a spreadsheet. This makes it relatively easy to view and edit the data contained in the data table 82. Thus, the data table 82 can be utilized to generate time and motion study reports. The time and motion study reports may subsequently be used to identify a change in the work process of the beverage industry operation to improve how they service POP outlets.

In sequential fashion, consecutive activity records can be recorded for consecutive activities performed by worker 20. At the end of each activity, the analyst selects the save event button 196 (or save for review 194) which causes the creation of a new activity record which is saved in data table 82. At the end of the study session when the user selects the end day menu item 230, denoting the end of the last activity for the study session, the data collection program 40 closes.

Operation

In the following description, FIGS. 19–26 are flowchart illustrations of methods and systems according to the present invention. It will be understood that each block of the flowchart illustrations, and combinations of the blocks in the flowchart illustrations, can be implements by computer program instructions. These computer program instructions may load onto a computer or other programmable apparatus to produce a machine, such that the instructions will execute on the computer or other programmable apparatus to create means for implementing the functions specified in the flowchart block or blocks. These computer program instructions may also be stored in a computer-readable memory that can direct the computer or other programmable apparatus to function in a particular manner, such that the instructions stored in the computer-readable memory produces an article of manufacturing including instructions which implement the function specified in the flowchart block or blocks.

The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the function specified in the flowchart block or blocks.

Accordingly, blocks within the flowchart illustrations support combinations of means for performing the specified functions and combinations of steps for performing the specified functions. It will be understood that each block of the flowchart illustrations, and the combinations of blocks in the flowchart illustrations, can be implemented by a special purpose hardware-based computer systems which perform the specified functions or steps, or combinations of special purpose hardware and computer instructions.

Figure 19:
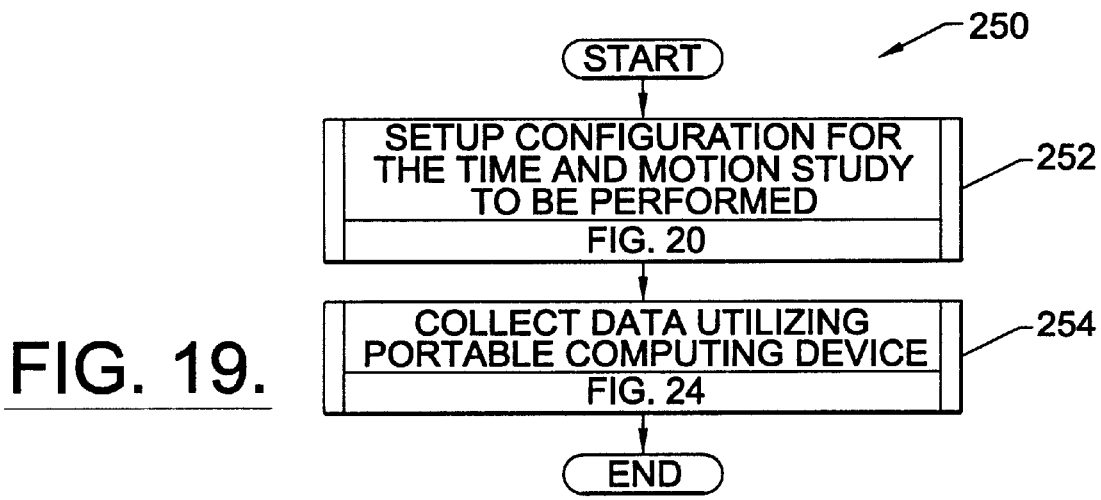
FIG. 19 is an flowchart of the present invention.

The architecture and functionality of the setup program 42 and data collection program 40 can be implemented with a computer program comprising instructions that causes the computer system 12 and portable computing device 10 to function in a particular manner as described below. FIG. 19 shows a flowchart 250 of a preferred operation and sequence of events for such computer programs implementing the present invention. Beginning at block 252, the setup configuration is performed to customize the user interfaces for the time and motion study to be performed. This is essentially achieved through the operation of the setup program 42 executing on the workstation 12. Next, at block 254, time and event data is collected utilizing the portable computing device 10. This is essentially achieved through the operation of the data collection program 40 executing on the portable computing device 10. However, it is noted that the setup program 42 and the data collection program 40 may be executed on the same device, such as the portable computing device 10.

Figure 20:
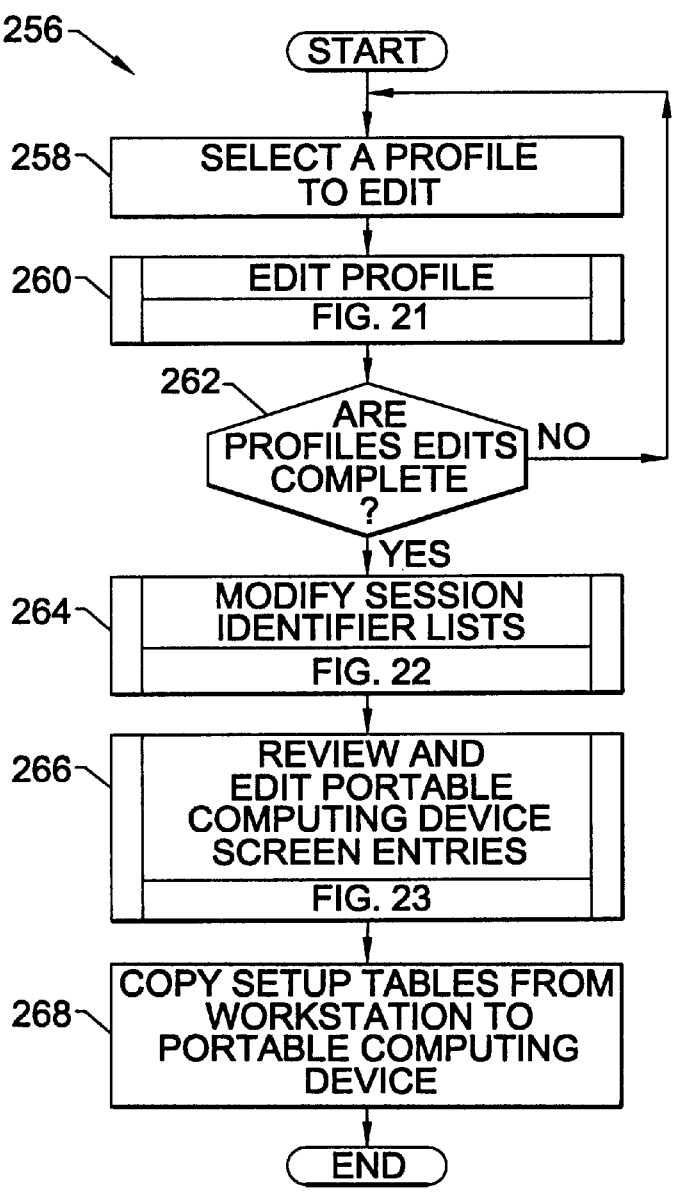
FIG. 20 is a flowchart of a setup program in accordance with the present invention.

A flowchart 256 of FIG. 20 illustrates the setup step 252 of flowchart 250 in more detail. In particular, the flowchart 252 illustrates the operation of sequence of events of the setup program 42. During setup, a profile is initially selected for modification, as indicated by block 258. The selected profile is edited at block 260, as described in further detail with reference to FIG. 21. It is then determined at block 262 if any other profiles are to be edited. If there is another profile to be edited, then the steps of block 258 and 260 are repeated. Otherwise, if there are no more profiles to be edited, then the session identifier lists are modified at block 264, as described in further detail with reference to FIG. 22. At block 266, the data collection screen entries are viewed and edited, as described in further detail with reference to FIG. 23. The edited profile(s), session identifier lists and screen entries are stored as a setup table(s) 76 by the setup program 42 so that they can subsequently be used by the data collection program 40. The setup table(s) 76 created by the setup program 42 are transferred from the computer system 12 to the corresponding set up table(s) 86 in the portable computing device 10, as indicated by block 268.

Figure 21:
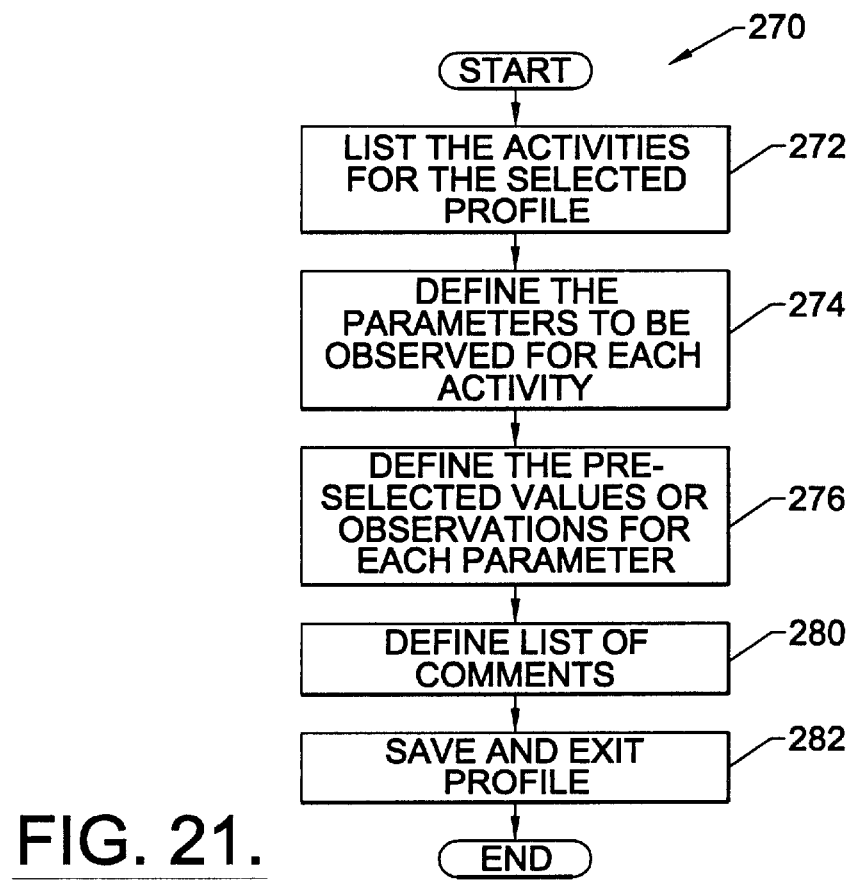
FIG. 21 is a flowchart of the profile edit step of the flowchart of FIG. 20.

Corresponding to the step of block 260 of the flowchart 256, a flowchart 270 of FIG. 21 is directed to the operation and sequence of events for editing a profile. Beginning at block 272, a list of activities for the selected profile is generated or edited as desired. A list of parameters for the activities are defined, as indicated by block 274. For each parameter defined, a list of pre-selected values or observations are defined, as indicated by block 276. A list of comments is also defined, as indicated by block 280. The edited profile is then saved and exited, as indicated by block 282. The edits and modifications made in the above steps are saved in spreadsheet files and in comma separated value files. The spreadsheet files enable the user to interface with the setup program 42, and the comma separated value files are used by data collection program 40 for configuring the user interfaces of the data collection program 40 running on the portable computing device 10. Thus, the comma separated value files comprise the setup table(s) 76 described herein as being transferred to the corresponding setup table (s) 86 in the data collection program 40.

Figure 22:
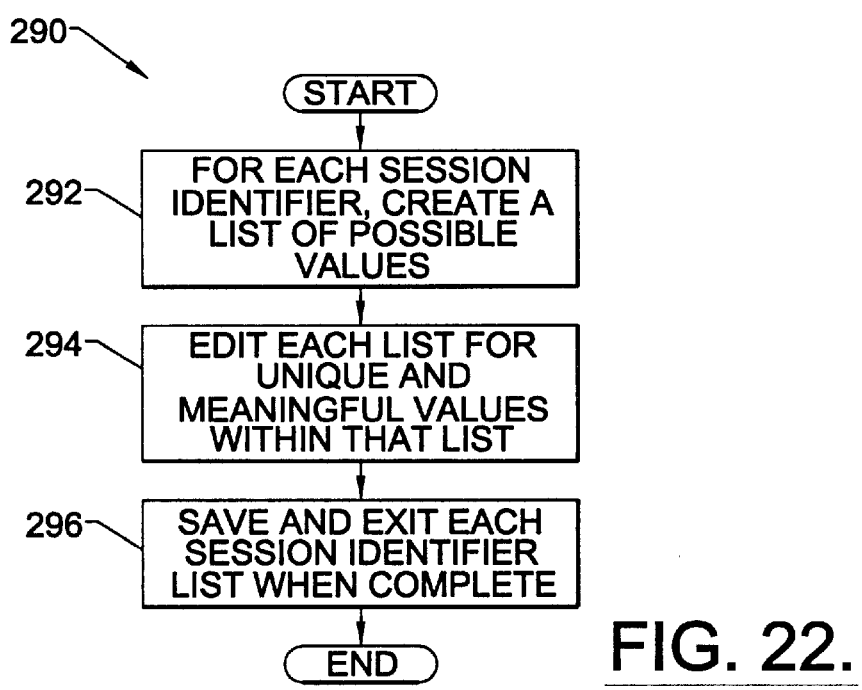
FIG. 22 is a flowchart of the session identifier list creation step of the flowchart of FIG. 20.

Corresponding to the step of block 264 of the flowchart 256, a flowchart 290 of FIG. 22 is directed to the operation and sequence of events for modifying the session identifiers. In particular, at block 292, a list of possible values is created for each session identifier. At block 294, the values are edited to ensure that each value is unique and meaningful. The session identifier list can then be saved and exited, as indicated by block 296. As with the profiles, the session identifiers are saved as both spreadsheet files and comma separated value files.

Figure 23:
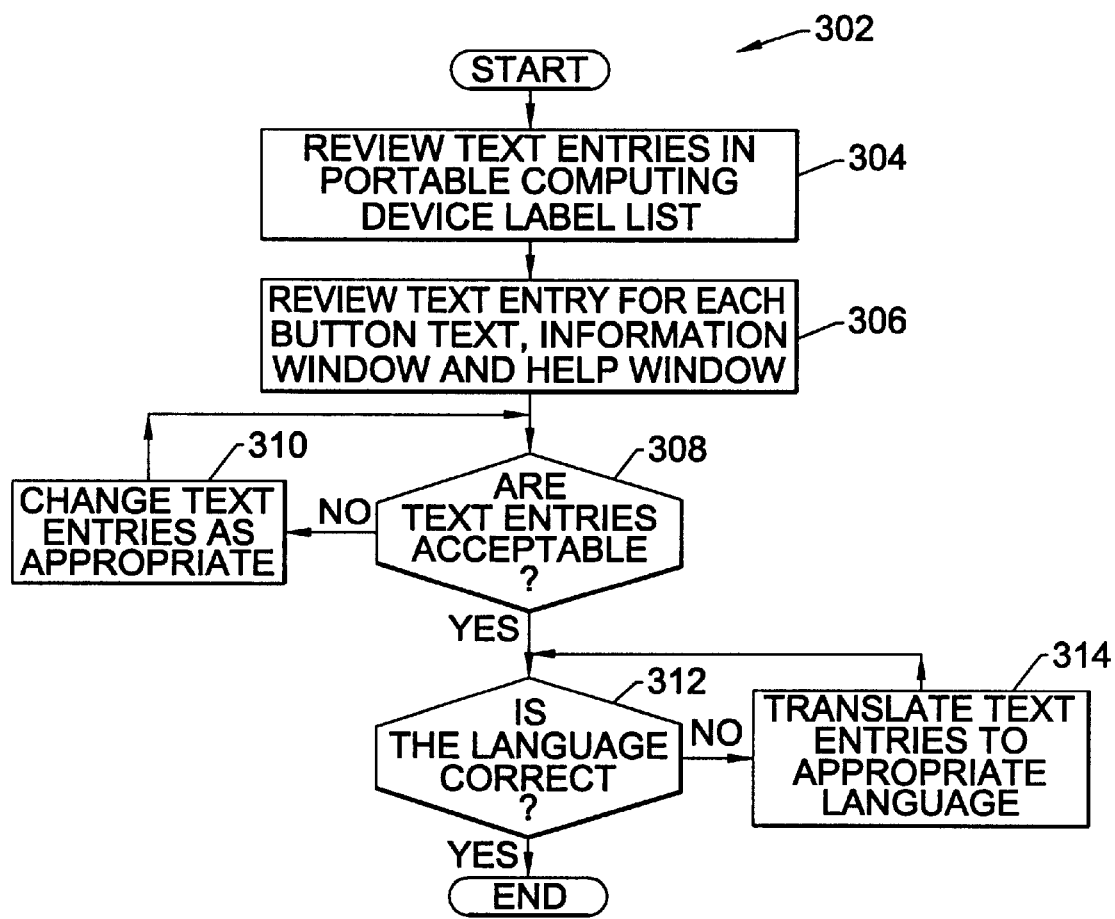
FIG. 23 is a flowchart of the review and edit of the data collection screen entries step of the flowchart of FIG. 20.

Corresponding to the step of block 266 of flowchart 256, a flowchart 302 of FIG. 23 is directed to the operation and sequence of events for the review and edit screen entry step. At block 304, the entries of the label list for the portable computing device 10 are reviewed. The button text, information window and help window text are also reviewed, as indicated by block 306. It is then determined at block 308 if the text entries are acceptable. If the text entries are not acceptable, then the appropriate changes are made at block 310. If the text entries are acceptable, then it is determined at block 312 if the language is correct. If the language is not correct, then the appropriate translations are made at block 314. If the language is correct for all text entries, the process is ended.

Figure 24:
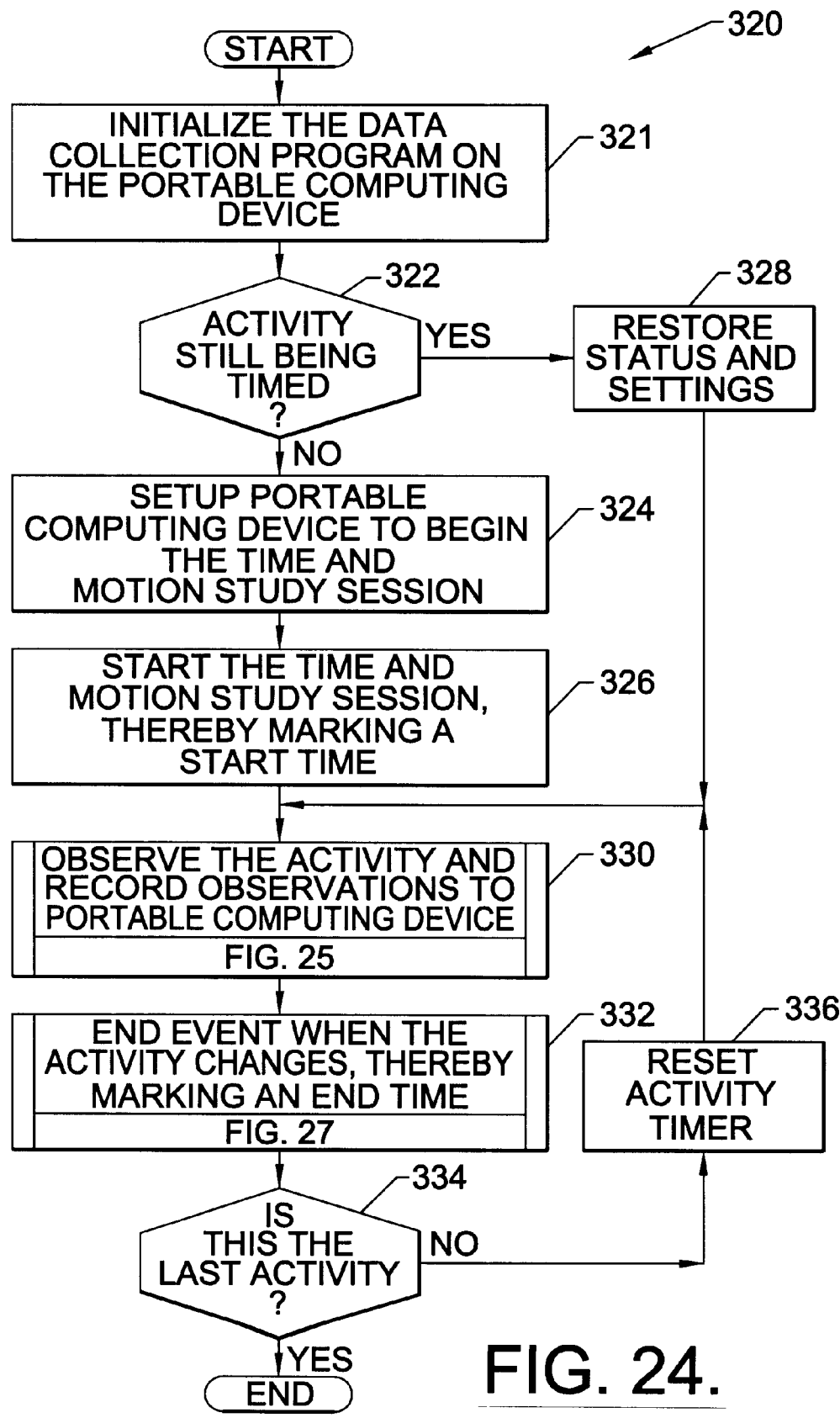
FIG. 24 is a flowchart of a data collection program in accordance with the present invention.

A flowchart 320 of FIG. 24 illustrates the data collection step 254 of flowchart 250 in more detail. In particular, the flowchart 320 illustrates the operation of sequence of events of the data collection program 40. At block 321, the data collection program 40 begins executing on the portable computing device 10. At block 322, an initial inquiry is made to determine if an activity is still being timed. This may occur when the portable computing device 10 was previously turned off or lost power (such as when the main battery is changed) before the last event was saved. This step comprises looking for a working file 59 in the memory of the portable computing device 10. If a working file 59 is located, then the data collection program 40 recognizes that the device 10 was timing an event when it last had power. If it is determined at block 322 that an activity was still being timed, then the status and settings associated with that activity are restored, as indicated by block 328. The step of restoring the status and settings at block 328 comprises reading the setup values and all activity and parameter selections from the working file 59 to restore the running screen, and reading the start date and time from the working file to restore the activity timer. Thus, the data collection program 40 can continue to measure the activity time as though the power loss did not occur or the program did not stop.

If a working file is not located, then the portable computing device 10 is setup to start a new time study session, as indicated by block 324. The setup step for the portable computing device includes reading the setup tables 86 (i.e., the comma separated value files) and then utilizing the information from the setup tables to generating user interfaces. A time and motion study session can then be initiated at block 326 by the selection of the start session button 166 (FIG. 11).

At block 330, the user observes the activity and records observations to the portable computing device 10, as further described below with reference to FIG. 25. At the end of the observed activity, the user marks the end by selecting the save event button 196 or save for review button 194 (FIG. 12A or 14), as indicated by block 332 and as described in further detail below with reference to FIG. 26. It is then determined at block 334 whether the event is the last activity for the session. If it is not, then the date/time is read from the internal clock of the portable computing device 10 and is used to update the working file, and the activity time displayed on the save event button 196 is reset to zero and a new activity time is displayed, as indicate by block 336. The steps of blocks 330, 332 and 336 are repeated as appropriate for each sequential activity until it is determined at block 334 that it was the last activity, then the time and motion study session ends.

Figure 25:
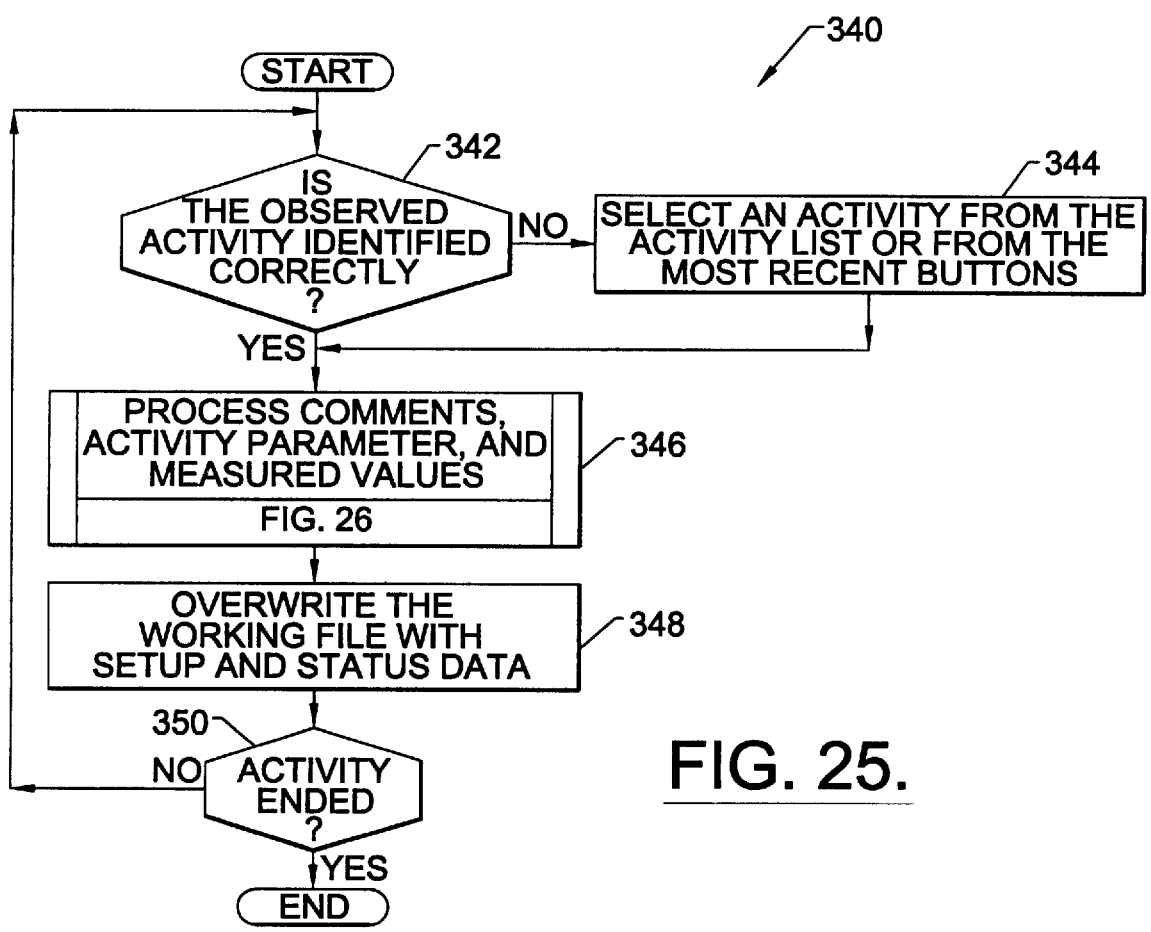
FIG. 25 is a flowchart of the observing and recording step of the flowchart of FIG. 24.

Corresponding with the step of block 330 of flowchart 320, a flowchart 340 of FIG. 25 illustrates the operation and sequence of events for the activity observation and recording step. At block 342, it is determined if the activity being observed is identified correctly. If it is not, then the correct activity is selected from the activity field 178 or from the most recent buttons 190, as indicated by block 344. Once the activity is identified correctly, it is then determined at block 346 if a comment is needed, if parameters need to be selected, or if a count or measurable variable tracked. While these steps are shown in a parallel arrangement in FIG. 26, it will be appreciated by one of ordinary skill in the art of programming that these steps may be taken in any order, or in parallel fashion. However, for illustrative purposes, these steps will be handled as described below.

With particular reference to block 346, the user may be prompted to enter or may initiate the entry of comments, activity parameters, or measured values. As is possible with most current processor designs, processor 44 (FIG. 2) preferably processes any comment, activity parameters, and measured values in parallel, that is, substantially simultaneously. The working file 59 is then overwritten at block 348 with the current setup and status data whenever the user enters or changes any selection or input to the portable computing device 10. This is done so that the most current data is stored in memory in case of a power outage or the portable computing device stops running. It is then determined at block 350 whether the activity has ended. If the activity has not ended, then the steps of blocks 342–348 are performed again as described above. Thus, the observer can continue to monitor the activity while continuously performing steps of blocks 342–348 until it is determined at block 350 that the activity has changed or ended, which ends flowchart 340.

Figure 26:
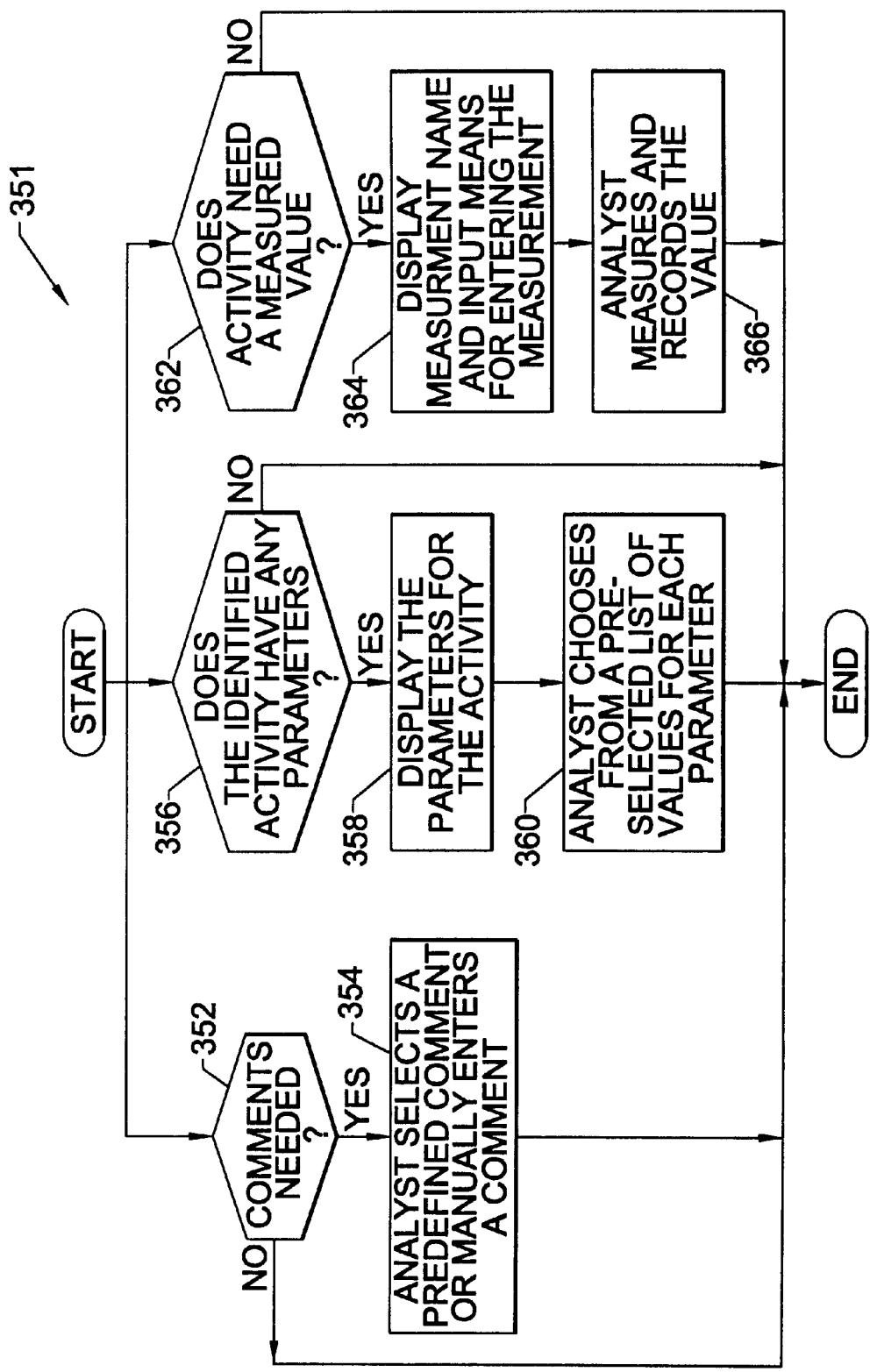
FIG. 26 is a flowchart of the comment, activity parameter and measured valve processing step of the flowchart of FIG. 25.

Corresponding the step of block 346 of flowchart 340, a flowchart 351 of FIG. 26 illustrates the operation and sequence of events for the step of the parallel processing of any comments, activity parameters, and measured values. If it is determined at block 352 that a comment is needed, then the user selects one of the predefined comments or manually enters a comment in the comment field 176, as indicated by block 354. In parallel fashion, it is then determined at block 356 if the activity has any parameters that need to be selected. If there are parameters that need to be selected, then the parameters are displayed to the user via the parameter field 204, as indicated by block 358. The user can then choose from the pre-selected list of values for each parameter, as indicated by block 360. Again in parallel fashion, at block 362, it is determined if a measured value is needed, such as a counter to track a count in the present embodiment or some other measurable variable. If a value needs to be measured, then the measurement name and input means for entering the measurement are presented to the user, as indicated by block 364. In the present embodiment, the user is presented with a counter 224 to track a count associated with the activity. At block 366, the user enters the measurement value directly into the input field 220, resets the value to the default value by selecting the reset button 218, or increments or decrements the value by selecting the plus button 214 or the minus button 216, respectively.

Figure 27:
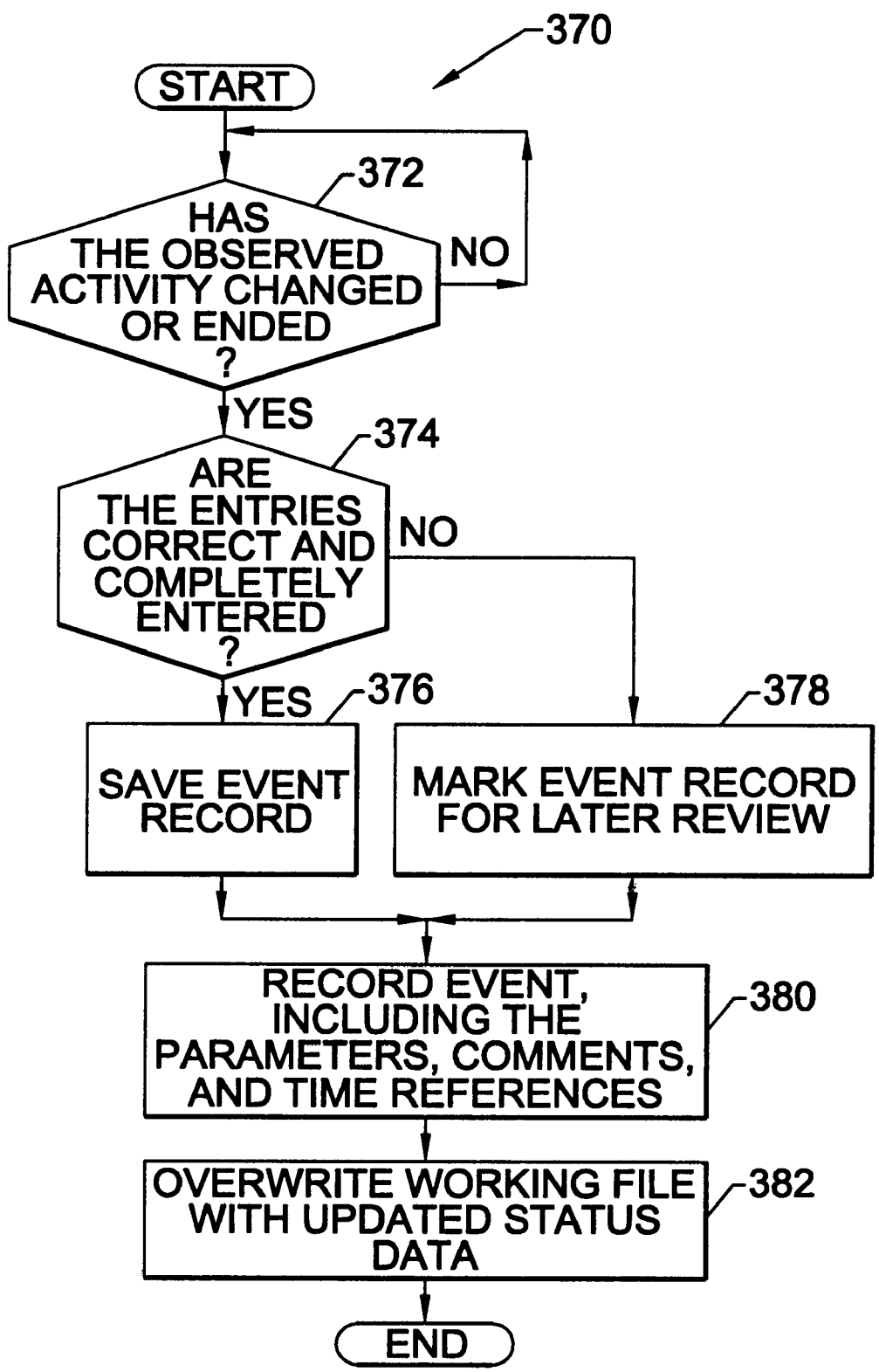
FIG. 27 is a flowchart of the save event step of the flowchart of FIG. 24.

Corresponding to the step of block 332 of flowchart 320, a flowchart 370 of FIG. 27 illustrates the operation and sequence of events for the end event step. At block 372, it is determined if the observed activity has changed or ended. If it has not, then the observation continues and the inquiry of block 372 is repeated. If it is determined that the activity has changed or ended, then it is determined at block 374 whether the entries (i.e., activity name, parameters, counter or variable measurement, comment, etc.) have been accurately and completely entered. If the entries are correct, then the event record is saved, such as by selecting the save event button 196, as indicated at block 376. If the entries are not correct, then the save for review button 194 is selected to mark the record for later review, as indicated at block 378. At block 380, the event is recorded, including the parameters, comments, and time references (e.g., start time, end time and/or elapsed time). The working file 59 is then overwritten at block 382 with the current setup and status data.

Figure 28:
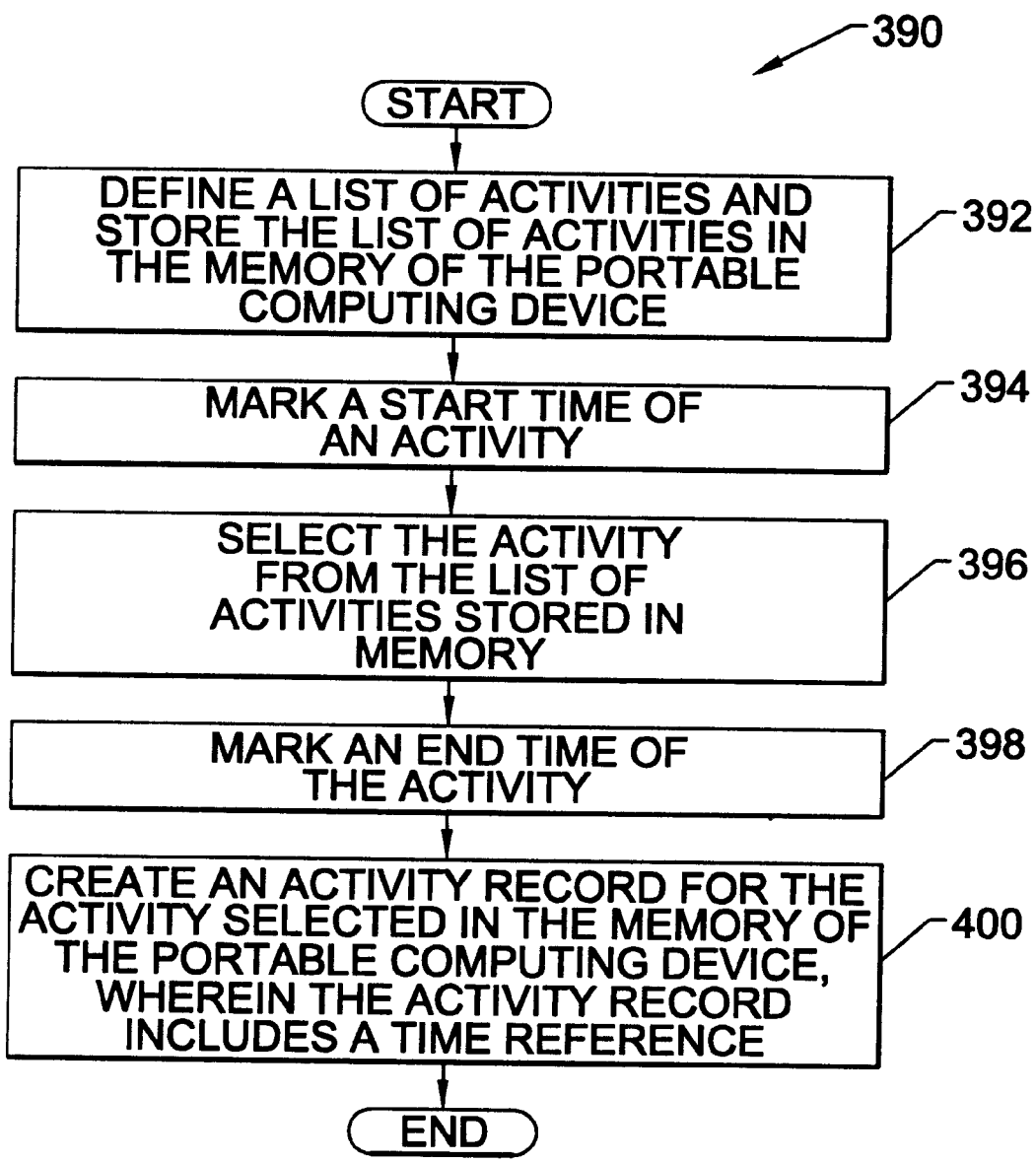
FIG. 28 is a high level flowchart in accordance with an embodiment of the present invention.

As illustrative of the operation of the present invention at a high level, a flowchart 390 is provided as illustrated in FIG. 28. While there are many variations to the following sequence of event and functions that are within the scope of the present invention, the following is provided as illustrative. Thus, a method for conducting time studies using a portable computing device having a memory may comprise the step of defining a list of activities and storing the list of activities in the memory of the portable computing device, as indicated in block 392. In block 394, a start time is marked for an observed activity. The observed activity is selected, preferably from the list of activities stored in memory, as indicated in block 396. The end of the activity is marked at block 398, and an activity record is created in block 400. The activity record preferably includes a time reference in the memory.

The foregoing is illustrative of the present invention and is not to be construed as limiting thereof Although a few exemplary embodiments of this invention have been described, those with skill in the art would readily appreciate that many modifications and variations are possible in the exemplary embodiments without materially departing from the novel teachings and advantages of this invention. Accordingly, all such modifications and variations are intended to be included within the scope of this invention as defined in the claims.

Wherefore, the following is claimed:

1. A method for conducting time and motion studies where an analyst observes and records data for activities performed by a worker, wherein the analyst records the time and event data utilizing a portable computing device having a memory, the method comprising the steps of:

generating a setup table stored at a workstation and comprising session identifiers and a list of activities, wherein associated with at least one activity is a parameter having a list of pre-selected values;

transferring the setup table to the portable computing device;

generating a graphical user interface for the portable computing device based on the setup table, wherein the graphical user interface presents the activities to the analyst as selectable options;

selecting an activity being performed by the worker from the list of activities displayed via the graphical user interface;

generating a graphical user interface for the portable computing device based on the selected activity, wherein the graphical user interface is limited to presenting to the analyst the parameters associated with the selected activity; and recording an activity record in the memory, wherein the activity record includes a time reference that represents an elapsed time for the activity and a parameter value inputted into the portable computing device via the graphical user interface.

2. The method of claim 1, further comprising the step of marking an end of the activity, and wherein said step of recording the activity record is responsive to said step of marking the end of the activity.

3. The method of claim 1, wherein a parameter associated with the selected activity is a count, further including the step of receiving via the graphical user interface a incremental count value associated with the activity selected.

4. The method of claim 1, wherein said step of recording an activity record includes the step of recording a session identifier in the activity record.

5. The method of claim 1, further comprising the step of selecting a session identifier associated with one of the analyst and worker via the graphical user interface.

6. The method of claim 1, wherein said step of recording an activity record includes the step of recording a session identifier, an activity name, associated parameter values, and a count in the activity record.

7. The method of claim 6, further including the step of receiving a request of the analyst via the graphical user interface to save the activity record for review, and wherein said step of recording an activity record includes the step of marking the activity record in response to the request.

8. The method of claim 1, further comprising the step of receiving via the graphical user interface a manually entered comment.

9. The method of claim 8, wherein said step of recording an activity record includes the step of recording the comment in the activity record.

10. A system for conducting time and motion studies using a portable computing device having a memory, comprising:

a workstation including a setup program that creates a setup table comprising a list of activities, wherein associated with at least one activity is a parameter having a list of pre-selected values;

a communication link connecting the workstation to the portable computing device, for transmitting the setup table from the workstation to the portable computing device, wherein the setup table is stored in the memory of the portable computing device;

the portable computing device includes a data collection program for generating a graphical user interface having at least one selectable activity based on the setup table, wherein the graphical user interface presents only the parameters associated with a selected activity; and wherein the portable computing device includes a memory in which is stored in an activity record having a time reference that represents an elapsed time for an activity and a parameter value inputted into the portable computer device via the graphical user interface.

11. The system of claim 10, wherein the setup table includes session identifiers.

12. The system of claim 10, wherein the data collection program records an activity record in the memory of the portable computing device, wherein the activity record includes a time reference that represents an elapsed time for the activity and a parameter value inputted into the portable computing device via the graphical user interface.

13. The system of claim 12, wherein the memory of the portable computing device includes a data table comprising activity records.

14. The system of claim 10, wherein the data collection program generates a graphical user interface comprising a list of selectable predefined values for a parameter associated with the selected activity.

15. The system of claim 14, further comprises a report based on said data table.

16. A computer program product for conducting time and motion studies in which an analyst observes a worker performing an activity and records data using a portable computing device, the computer program product comprising:

a computer-readable storage medium having computer-readable program code means embodied in said medium, said computer-readable program code means comprising:

computer readable program code means for generating a setup table stored at a workstation and comprising session identifiers and a list of activities, wherein associated with at least one activity is a customized parameter having a list of pre-selected values;

computer readable program code means for transferring the setup table to the portable computing device;

computer readable program code means for generating a graphical user interface for the portable computing device based on the setup table, wherein the graphical user interface presents the activities to the analyst as selectable options;

computer readable program code means for selecting an activity being performed by the worker from the list of activities displayed via the graphical user interface;

computer readable program code means for generating a graphical user interface for the portable computing device based on the selected activity, wherein the graphical user interface presents to the analyst only the parameters associated with the selected activity; and computer readable program code means for recording an activity record in the memory, wherein the activity record includes a time reference that represents an elapsed time for the activity and a parameter value inputted into the portable computing device via the graphical user interface.

* * * * *